(12) United States Patent
Kanda et al.

(10) Patent No.: US 7,142,393 B2
(45) Date of Patent: Nov. 28, 2006

(54) MAGNETIC HEAD AND MAGNETIC DISK APPARATUS

(75) Inventors: Koki Kanda, Kawasaki (JP); Minoru Takahashi, Kawasaki (JP); Katsumi Kiuchi, Kawasaki (JP); Takao Koshikawa, Kawasaki (JP); Katsuhide Sone, Aizuwakamatsu (JP); Muneo Kamiguchi, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/898,806

(22) Filed: Jul. 3, 2001

(65) Prior Publication Data

US 2002/0015265 A1    Feb. 7, 2002

Related U.S. Application Data

(60) Division of application No. 08/834,436, filed on Apr. 16, 1997, now Pat. No. 6,282,061, which is a continuation-in-part of application No. 08/401,958, filed on Mar. 10, 1995, now Pat. No. 5,634,259.

(30) Foreign Application Priority Data

Mar. 17, 1994  (JP)  ................................... 6-047518
Mar. 19, 1997  (JP)  ..................................... 9-66914

(51) Int. Cl.
G11B 5/60   (2006.01)
G11B 21/21  (2006.01)
G11B 5/31   (2006.01)

(52) U.S. Cl. ................................. 360/236.5; 360/235.7

(58) Field of Classification Search ............. 360/236.5, 360/235.7

See application file for complete search history.

(56) References Cited

U.S. PATENT DOCUMENTS

| | | | | |
|---|---|---|---|---|
| 4,333,229 A | * | 6/1982 | Ellenberger | ............... 29/603.12 |
| 4,624,048 A | | 11/1986 | Hinkel et al. | |
| 4,761,699 A | | 8/1988 | Ainslie et al. | |
| 5,047,884 A | | 9/1991 | Negishi et al. | |
| 5,065,500 A | | 11/1991 | Yoneda et al. | |
| 5,083,365 A | | 1/1992 | Matsumoto | |
| 5,126,901 A | * | 6/1992 | Momoi et al. | ........... 360/234.5 |
| 5,200,869 A | * | 4/1993 | Matsuzaki | ............... 360/234.5 |
| 5,267,109 A | * | 11/1993 | Chapin et al. | ........... 360/236.5 |

(Continued)

FOREIGN PATENT DOCUMENTS

JP         55-101135         8/1980

(Continued)

*Primary Examiner*—William J Klimowicz
(74) *Attorney, Agent, or Firm*—Greer, Burns & Crain, Ltd.

(57) ABSTRACT

An MR head includes a slider, and a film structure part which is located on an air outflow side of the slider and includes an MR element for reproducing. The film structure part has an end surface located on an identical side as a floating surface of the slider. The end surface of the film structure part and the floating surface of the slider form a step-like recess which has a depth making it possible to prevent a fine projection on a magnetic disk from hitting the end surface of the film structure part.

5 Claims, 32 Drawing Sheets

U.S. PATENT DOCUMENTS

| | | | |
|---|---|---|---|
| 5,296,982 A * | 3/1994 | Terada et al. | 360/234.5 |
| 5,301,077 A * | 4/1994 | Yamaguchi et al. | 360/236.7 |
| 5,331,497 A | 7/1994 | Fuchigami | |
| 5,469,312 A | 11/1995 | Watanabe et al. | |
| 5,546,251 A | 8/1996 | Egawa et al. | |
| 5,634,259 A | 6/1997 | Sone et al. | |
| 5,768,055 A | 6/1998 | Tian et al. | |
| 5,822,153 A | 10/1998 | Lairson et al. | |
| 5,844,749 A | 12/1998 | Sakai et al. | |
| 5,872,684 A * | 2/1999 | Hadfield et al. | 360/235.4 |
| 5,886,856 A | 3/1999 | Tokuyama et al. | |
| 6,111,723 A * | 8/2000 | Takano et al. | 360/122 |
| 6,178,068 B1 * | 1/2001 | Sugimoto | 360/236.5 |
| 6,198,600 B1 * | 3/2001 | Kitao et al. | 360/235.2 |
| 6,282,061 B1 * | 8/2001 | Kanda et al. | 360/236.5 |

FOREIGN PATENT DOCUMENTS

| | | | |
|---|---|---|---|
| JP | 56159865 A * | 12/1981 | |
| JP | 61-170922 | 8/1986 | |
| JP | 61-196487 | 8/1986 | |
| JP | 61-210511 | 9/1986 | |
| JP | 62057119 A * | 3/1987 | |
| JP | 3-40278 | 2/1991 | |
| JP | 3-120608 | 5/1991 | |
| JP | 03127317 A * | 5/1991 | |
| JP | 03132910 A * | 6/1991 | |
| JP | 3-250416 | 11/1991 | |
| JP | 4-40681 | 2/1992 | |
| JP | 4-335276 | 11/1992 | |
| JP | 04337580 A * | 11/1992 | |
| JP | 04366408 A * | 12/1992 | |
| JP | 05189722 A * | 7/1993 | |
| JP | 5-266429 | 10/1993 | |
| JP | 07006540 A * | 1/1995 | |
| JP | 07021519 A * | 1/1995 | |
| JP | 07021718 A * | 1/1995 | |
| JP | 09-293217 | 11/1997 | |

* cited by examiner

FIG. 5

| APPARATUS \ TEMPERATURE RISE | 0 (NOT CONDUCTING) | 10 °C | 20 °C | 30 °C | 40 °C | 50 °C [nm] |
|---|---|---|---|---|---|---|
| APPARATUS 1 | 13.92 | 7.92 | 1.92 | −4.08 | −10.08 | −16.08 |
| APPARATUS 2 | 5.74 | −0.26 | −6.26 | −12.26 | −18.26 | −24.26 |

FIG. 7

| A' E / TEMPERATURE RISE | 45 [μm] | 40 | 35 | 30 | 25 (nm) |
|---|---|---|---|---|---|
| 10 °C | − 0.26 | + 1.42 | + 3.09 | + 4.76 | + 6.44 |
| 20 °C | − 6.26 | − 3.38 | − 0.51 | + 2.36 | + 5.24 |
| 30 °C | −12.26 | − 8.18 | − 4.11 | − 0.04 | + 4.04 |

MAGNETIC HEAD AND MAGNETIC DISK APPARATUS

CROSS-REFERENCE OF THE RELATED APPLICATION

This is a divisional of application Ser. No. 08/834,436, filed Apr. 16, 1997, now issued U.S. Pat. No. 6,282,061, which is a Continuation-In-Part of application Ser. No. 08/401,958, filed Mar. 10, 1995 (issued as U.S. Pat. No. 5,634,259).

BACKGROUND OF THE INVENTION

1. Field of the Invention

The present invention relates to a magnetic head used in a magnetic disk apparatus for recording information on and reproducing information from a recording medium.

Recently, as the size of a magnetic disk apparatus has been reduced and the storage capacity thereof has been enlarged, the recording density of a recording medium has become high, and thus a magnetic head which floats low over the disk (small clearance) is required. However, because of the requirement that the magnetic head be resistant to shock, there is also a need to reduce occurrences of contact between the magnetic head and the disk.

2. Description of the Related Art

FIGS. 1A, 1B and 1C show a construction of a conventional magnetic head. Referring to FIG. 1A, two rail surfaces 13a and 13b are formed on the surface of a core slider 12 of a magnetic head 11, which surface faces a magnetic disk (recording medium). The rail surfaces 13a and 13b are made to extend in the direction in which air flows. Tapered surfaces 14a and 14b which allow the head to float are formed on the side at which air enters the space between the head and the disk.

On an end face of the rail surface 13a at which face air exits the space between the head and the disk, a thin-film element 15 for writing and reading information is provided. As shown in FIG. 1B, the thin-film element 15 is formed such that an insulating film (alumina) 16 is formed on the end face of the core slider 12 (rail surface 13a), and a magnetic film 17 is formed on the insulating film 16. An insulating film 18 is formed on the magnetic film 17, and a coil 19 is provided in the insulating film 18. A magnetic film 20 is formed on the insulating film 18. Recording and reproduction are performed in a gap 22 formed between the magnetic film 17 and the magnetic film 20. A protective film (insulating film) 21 is formed on the magnetic film 20 in the thin-film element 15. The shaded area indicates that portion of the protective film which is susceptible to temperature increase.

The rail surfaces 13a and 13b are chamfered (applied with a lapping process) as indicated by broken lines in FIG. 1C so as to allow air to flow smoothly. Both the width and height of the chamfering are 0–10 μm. A distance L between the end face of the core slider 12 and the end of the protective film 21 is set such that L≧0.025 mm. A distance S (thickness of the protective film) between the magnetic film 20 and the end of the protective film 21 is set such that S≈0.015–0.02 mm.

The magnetic head 11 is enabled to float over the magnetic disk by receiving an air flow generated by the rotating magnetic disk. In order that damage caused by the contacting of the magnetic head 11 with the magnetic disk be minimized, a thin film of DLC (diamond-like carbon) or the like may be provided on the rail surfaces 13a and 13b (including the tapered surfaces 14a and 14b) and/or on the magnetic disk, or burrs created by the chamfering of the rail surfaces 13a and 13b may be removed.

FIG. 2 explains thermal expansion of the protective film of the conventional magnetic head. Referring to FIG. 2, when the magnetic head 11 is driven for a recording operation, the temperature of the thin-film element 15 rises because a current is fed to the coil 19, with the result that the protective film 21 swells due to thermal expansion, as indicated by a shaded end part 21' in FIG. 2. For example, it was experimentally found that a swelling of the protective film 21 of alumina measured 6 nm per temperature rise of 10° C.

Hence, the narrowest achievable separation (clearance) between the magnetic head 11 and the magnetic disk depends on the magnitude of the swelling of the protective film 21 and on the spacing between the head and the disk. Accordingly, frequent contacts between the head and the disk may occur. Powder created from abrasion damages the thin-film element 15 and the disk. Therefore, it becomes difficult to secure small clearance.

Further, the chamfering of the rail surfaces 13a and 13b of the core slider 12 is done after a wafer having the thin-film element 15 formed thereon is cut and the rail surfaces 13a and 13b are formed. If the chamfering process is applied to the thin-film element 15, a variation in the quality of the produced head results. For example, the electromagnetic transducing property may deteriorate.

Furthermore, the conventional magnetic head is liable to be affected by a fine projection located on the magnetic disk. If the magnetic head is affected by such a fine projection, an abnormal signal will be superimposed on the read signal, as will be described in detail later.

SUMMARY OF THE INVENTION

Accordingly, it is a general object of the present invention to provide a novel and useful magnetic head in which the aforementioned problems of the prior art are eliminated.

A more specific object of the present invention is to provide a MR head that has an improved structure which makes it possible for a fine projection on the magnetic disk to hit the MR head without causing an abnormal reproduction signal.

The above objects of the present invention are achieved by an MR head comprising: a slider; and a film structure part which is located on an air outflow side of the slider and includes an MR element for reproducing, the film structure part having an end surface located on an identical side as a floating surface of the slider, the end surface of the film structure part and the floating surface of the slider forming a step-like recess which has a depth making it possible to prevent a fine projection on a magnetic disk from hitting the end surface of the film structure part.

The MR head may be configured so that the depth of the step-like recess an end of the MR element on the end surface of the film structure part to be located on or above an imaginary line which passes through a rear edge of the slider and the end of the MR head when the MR head is in a floating state at a given floating angle.

The MR head may be configured so that: the depth of the step-like recess has a length equal to or greater than a sum of a first length and a second length; the first length causes an end of the MR element on the end surface of the film structure part to be located on an imaginary line which passes through a read edge of the slider that is in a floating state at a given angle and which is parallel to the magnetic disk; and the second length corresponds to a magnitude of a swelling of the end surface of the film structure part, the swelling being formed when the film structure part is thermally deformed.

The MR head may be configured so that: the depth of the step-like recess has a length equal to or greater than a sum of a first length and a second length; the first length causes an end of the MR element on the end surface of the film structure part to be located on an imaginary line which passes through a read edge of the slider that is in a floating state at a given angle and which is parallel to the magnetic disk; and the second length corresponds to a descending movement of the MR head after the MR head is pushed upwardly by the fine projection, the descending movement including an overshooting movement.

The MR head may be configured so that: the depth of the step-like recess causes has a length equal to or greater than a sum of a first length, a second length, and a third length; the first length causes an end of the MR element on the end surface of the film structure part to be located on an imaginary line which passes through a read edge of the slider that is in a floating state at a given angle and which is parallel to the magnetic disk; the second length corresponds to a magnitude of a swelling of the end surface of the film structure part, the swelling being formed when the film structure part is thermally deformed; and the third length corresponds to a descending movement of the MR head after the MR head is pushed upwardly by the fine projection, the descending movement including an overshooting movement.

The MR head may be configured so that the depth of the step-like recess satisfies the following condition:

$$Y1 \geq t1 \times \tan \alpha$$

where Y1 is the depth of the step-like recess, t1 is a distance between an air outflow end of the slider and the MR element, and α is the floating angle.

The MR head may be configured so that the depth of the step-like recess satisfies the following condition:

$$Y3 \geq (t1 \times \tan \alpha) + Nh$$

where Y3 is the depth of the step-like recess, t1 is a distance between an air outflow end of the slider and the MR element, α is the floating angle, and Nh is a magnitude of a swelling of the end surface of the film structure part, the swelling being formed when the film structure part is thermally deformed.

The MR head may be configured so that the depth of the step-like recess satisfies the following condition:

$$Y4 \geq (t1 \times \tan \alpha) + Z$$

where Y4 is the depth of the step-like recess, t1 is a distance between an air outflow end of the slider and the MR element, α is the floating angle, and Z is a descending movement of the MR head after the MR head is pushed upwardly by the fine projection, the descending movement including an overshooting movement.

The MR head may be configured so that the depth of the step-like recess satisfies the following condition:

$$Y5 \geq (t1 \times \tan \alpha) + Nh + Z$$

where Y5 is the depth of the step-like recess, t1 is a distance between an air outflow end of the slider and the MR element, α is the floating angle, Nh is a magnitude of a swelling of the end surface of the film structure part, the swelling being formed when the film structure part is thermally deformed, and Z is a descending movement of the MR head after the MR head is pushed upwardly by the fine projection, the descending movement including an overshooting movement.

The above objects of the present invention are also achieved by an MR head comprising: a slider; and a film structure part which is located on an air outflow side of the slider and includes an MR element for reproducing, the film structure part having an end surface located on an identical side as a floating surface of the slider, the end surface of the film structure part and the floating surface of the slider forming a step-like recess which has a depth making it possible to prevent a fine projection on a magnetic disk from hitting the end surface of the film structure part, and causes a first rear edge of the film structure part to be located on or above an imaginary line which passes through the first rear edge of the film structure part and a second rear edge of the slider when the MR head is in a floating state at a given floating angle.

The MR head may be configured so that the depth of the step-like recess satisfies the following condition:

$$Y2 \geq t2 \times \tan \alpha$$

where Y2 is the depth of the step-like recess, t2 is a thickness of the film structure part, and α is the floating angle.

The MR head may be configured so that the depth of the step-like recess satisfies the following condition:

$$Y3' \geq (t2 \times \tan \alpha) + Nh$$

where Y3' is the depth of the step-like recess, t2 is a thickness of the film structure part, α is the floating angle, and Nh is a magnitude of a swelling of the end surface of the film structure part, the swelling being formed when the film structure part is thermally deformed.

The MR head may be configured so that the depth of the step-like recess satisfies the following condition:

$$Y4' \geq (t2 \times \tan \alpha) + Z$$

where Y4' is the depth of the step-like recess, t2 is a thickness of the film structure part, α is the floating angle, and Z is a descending movement of the MR head after the MR head is pushed upwardly by the fine projection, the descending movement including an overshooting movement.

The MR head may be configured so that the depth of the step-like recess satisfies the following condition:

$$Y5' \geq (t2 \times \tan \alpha) + Nh + Z$$

where Y5' is the depth of the step-like recess, t2 is a thickness of the film structure part, α is the floating angle, Nh is a magnitude of a swelling of the end surface of the film structure part, the swelling being formed when the film structure part is thermally deformed, and Z is a descending movement of the MR head after the MR head is pushed upwardly by the fine projection, the descending movement including an overshooting movement.

The above-mentioned objects of the present invention are also achieved by a magnetic disk apparatus comprising: a magnetic disk; an MR (MagnetoResistance effect) head; and a supporting member which movably supports the MR head above the magnetic disk. The MR head is configured as described above.

The magnetic disk apparatus may be configured so that: the supporting member comprises a suspension to which the MR head is fixed, and patterned wiring lines formed on the suspension; and ball members which are made of an electrically conductive material and connect terminals of the MR head and the patterned wiring lines.

BRIEF DESCRIPTION OF THE DRAWINGS

Other objects and further features of the present invention will be apparent from the following detailed description when read in conjunction with the accompanying drawings, in which:

FIG. 5 explains a relationship between a temperature rise in the magnetic head according to the first embodiment and a decrease in a recess amount;

FIG. 7 explains a relationship between a length of a non-tapered portion and the recess amount under different temperature rise conditions;

DETAILED DESCRIPTION

Figure 3A:
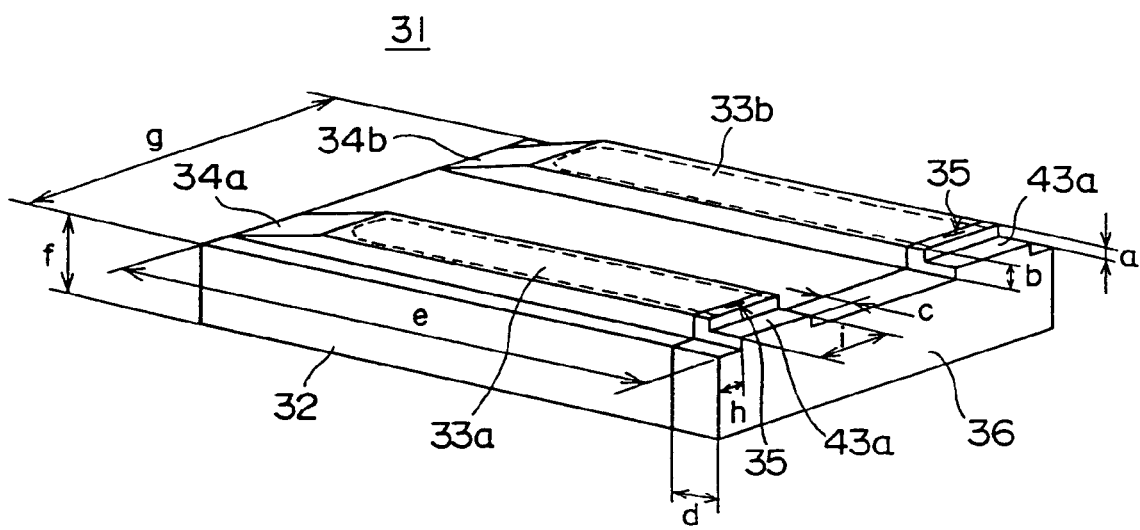
FIGS. 3A and 3B show a construction of a magnetic head of a first embodiment of the present invention.
Figure 3B:
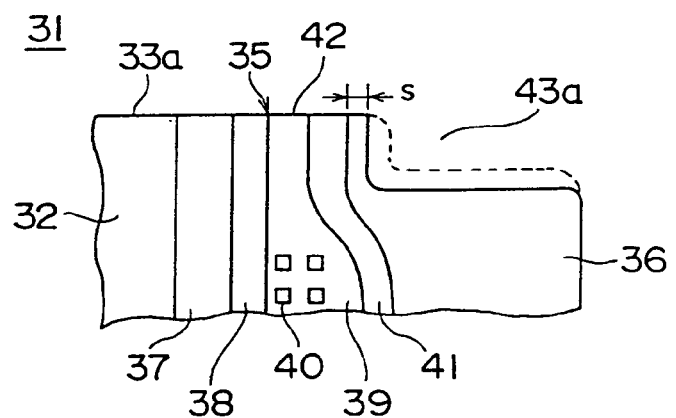

FIGS. 3A and 3B show a construction of the magnetic head of a first embodiment of the present invention. Referring to FIG. 3A, two rail surfaces 33a and 33b are formed on the surface of a core slider 32 of a magnetic head 31 which surface faces a magnetic disk (recording medium). The rail surfaces 33a and 33b are made to extend in the direction in which air flows. Tapered surfaces 34a and 34b for allowing the head to float are formed on an end of the core slider 32 at which end air is introduced into the space between the head and the disk.

On one end of each of the rail surfaces 33a and 33b, at which end air exits, a thin-film element 35 for writing and reading information and a protective film 36 are provided. As shown in FIG. 3B, the thin-element 35 is formed such that an insulating film 37 is formed on the end face of the core slider 32 (rail surfaces 33a and 33b), and a magnetic film 38 serving as a magnetic pole is formed on the insulating film 37. An insulating film 39 is formed on the magnetic film 38, and a coil 40 having a predetermined number of turns is provided in the insulating film 39.

A magnetic film 41 serving as a magnetic pole is provided on the insulating film 39. Recording and reproduction are performed in a gap 42 formed between the magnetic film 38 and the magnetic film 41. The protective film (insulating film) 36 is formed on the magnetic film 41 in the thin-film element 35.

A step-like recess 43a is formed in each of the rail surfaces 33a and 33b, respectively, near the thin-film element 35 so as to extend longitudinally toward an end of each of the rail surfaces at which air exits. A distance S (FIG. 3B) between the magnetic film 41 and the end of the protective film 36 is set such that S is as close as possible to zero, and at least smaller than 0.015 mm.

The rail surfaces 33a and 33b are chamfered (applied with a lapping process) as indicated by broken lines in FIG. 3A so as to allow air to flow smoothly and to reduce the amount of powder created when the disk comes into contact with the head and is thus abraded.

While the thin-film elements 35 is formed on the end face of both of the rail surfaces 33a and 33b, only one of the elements 35 is driven during a normal operation. This is to ensure that the thin-film elements 35 of the magnetic heads 31 over the respective surfaces of the magnetic disk are aligned. Alternatively, only one element may be provided at the center of the end of the core slider.

Typically, as indicated in FIG. 3A, the dimensions of the magnetic head of FIG. 3 are: a≧0.03 µm; b=0.045 mm; c=25 µm; d=40 µm; e=2 mm; f=1.6 mm; g=0.385 mm; h=0.054 mm; and i=0.255 mm. Alternatively, the dimensions may be set such that 0.01 mm≦c≦0.25 mm, and L≧0.02 mm.

The chamfering of the protective film in which a recess is provided will be discussed below.

Figure 4A:
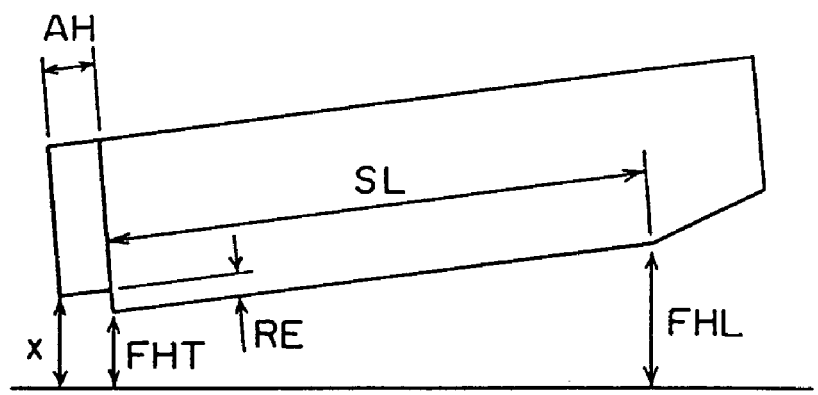
FIGS. 4A and 4B show a relative position of a magnetic head according to the first embodiment with respect to a recording medium.
Figure 4B:
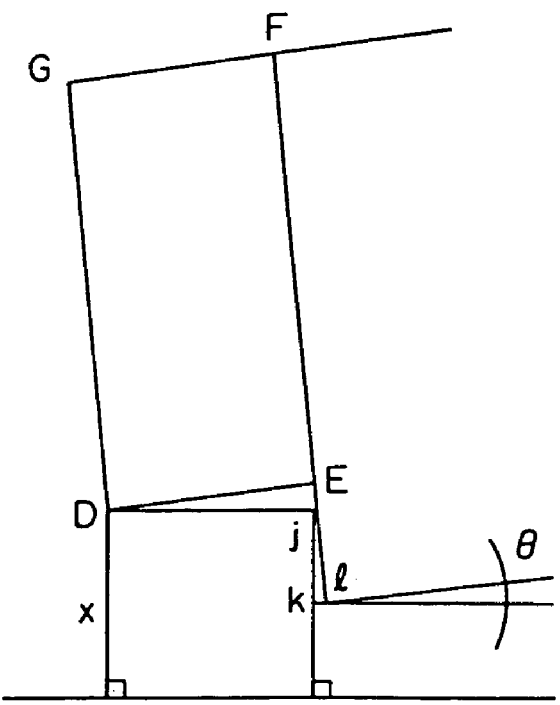

FIG. 4A is a schematic diagram showing the relative position of the magnetic head according to the first embodiment with respect to the recording medium. FIG. 4B is an enlarged view of the end of the magnetic head at which end air exits. The dimension indicated in FIG. 3A as a is indicated as RE in FIG. 4A. Desirably, RE has a value of 0.03 µm or greater.

Referring to FIG. 4A, FHT indicates a distance between the recording medium and the magnetic head, FHL indicates a distance between the air-entering end of the flat part of the core slider and the recording medium, SL indicates a length, as measured in the longitudinal direction, of the rail surfaces 33a and 33b, and AH indicates a thickness of the protective film, the length SL not including the tapered portion formed in the air-entering end of the core slider.

Referring to FIGS. 4A and 4B, x indicates a distance between the end of the protective film and the recording medium, and θ indicates an inclination of the magnetic head. x and θ are given by the following equations.

$$\theta = \sin^{-1}\{(FHL - FHT)/SL\}$$

$$x = RE\cos\theta - AH\sin\theta + FHT$$

$$(E_k = RE\cos\theta,\ E_j = AH\sin\theta)$$

It is preferred that, if RE has a value smaller than 0.03 µm, the end of the protective film be chamfered. In other words, a taper may be formed at the end of the protective film.

It is assumed that a magnetic disk apparatus 1 has a magnetic head whose dimensions are; RE=0.02 µm, FHT=0.1 µm, FHL=0.35 µm, SL=1.85×10³ µm, AH=45 µm. The values of x and θ in the apparatus 1 are as follows.

$$\theta = \sin^{-1}\{(FHL - FHT)/SL\}$$
$$= \sin^{-1}\{(0.35 - 0.1)/(1.85 \times 10^3)\}$$
$$= 0.00774\ [deg]$$

$$x = RE\cos\theta - AH\sin\theta + FHT$$
$$= 0.02\cos\theta - 45\sin\theta + 0.1$$
$$= 0.11392\ [\mu m]$$

It is further assumed that a magnetic disk apparatus 2 has a magnetic head whose dimensions are; RE=0.01 µm, FHT=0.07 µm, FHL=0.245 µm, SL=1.85×10³ µm, AH=45 µm. The values of x and θ in the apparatus 2 are as follows.

$$\theta = \sin^{-1}\{(FHL - FHT)/SL\}$$
$$= \sin^{-1}\{(0.245 - 0.07)/(1.85 \times 10^3)\}$$
$$= 0.00542\ [deg]$$

$$x = RE\cos\theta - AH\sin\theta + FHT$$
$$= 0.01\cos\theta - 45\sin\theta + 0.07$$
$$= 0.07574\ [\mu m]$$

When an element in a magnetic disk apparatus is energized, the temperature of the coil rises, and the protective film is made to swell toward the medium accordingly. FIG. 5 explains a variation of a difference (hereinafter, referred to as a recess amount) between x and FHT under different temperature rise conditions. A negative recess amount indicates that the end of the protective film is nearer the medium than the FHT gap is. It will be learned from FIG. 5 that, for each temperature rise of 10° C., the recess amount decreases by about 6 nm. When the temperature rise is equal to 50° C., the end of the protective film is nearer the medium than the FHT gap by a margin of 25 nm. It is determined from this that, if the length GD indicated in FIG. 4B is reduced by about 30 nm, the projection of the protective film beyond the FHT gap is prevented.

Figure 6A:
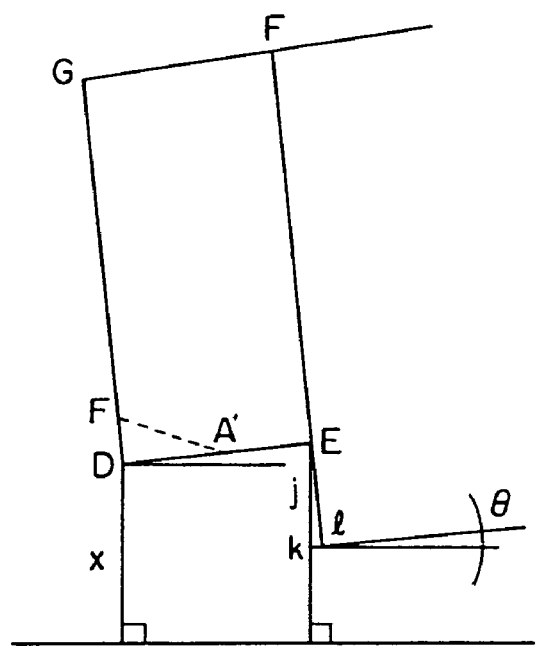
FIGS. 6A and 6B are schematic diagrams showing the relative position of the magnetic head according to a variation of the first embodiment with respect to the recording medium.
Figure 6B:
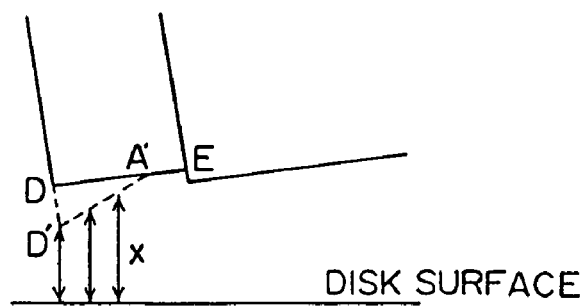

In order to prevent the projection of the protective film beyond the recording gap, a taper must be formed at the end of the protective film. FIGS. 6A and 6B are schematic diagrams showing the relative position of the magnetic head according to a variation of the first embodiment with respect to the recording medium. A broken line in FIG. 6A indicates a taper. A point D' in FIG. 6B indicates the end of the swollen protecting film. Assuming that DE is 1, four cases of taper formation will be considered.

Case 1: A'E=0.8
Case 2: A'E=0.6
Case 3: A'E=0.4
Case 4: A'E=0.2

Theoretically, on the basis of the similarity between a triangle A'FD and a triangle A'D'D, it will be determined that the degree of swelling of the protective film is in inverse proportion to a ratio of A'E to DE. That is, the shorter the length A'E, the smaller the degree of swelling of the protective film.

FIG. 7 explains a relationship between the length (A'E) of a non-tapered portion and the recess amount under different temperature rise conditions. FIG. 7 indicates that, for each temperature rise of 10° C., the recess amount decreases by about 6 nm. A shaded range in FIG. 7 indicates a range in which the protective film has a wider clearance than the recording gap with respect to the recording medium.

Figure 8:
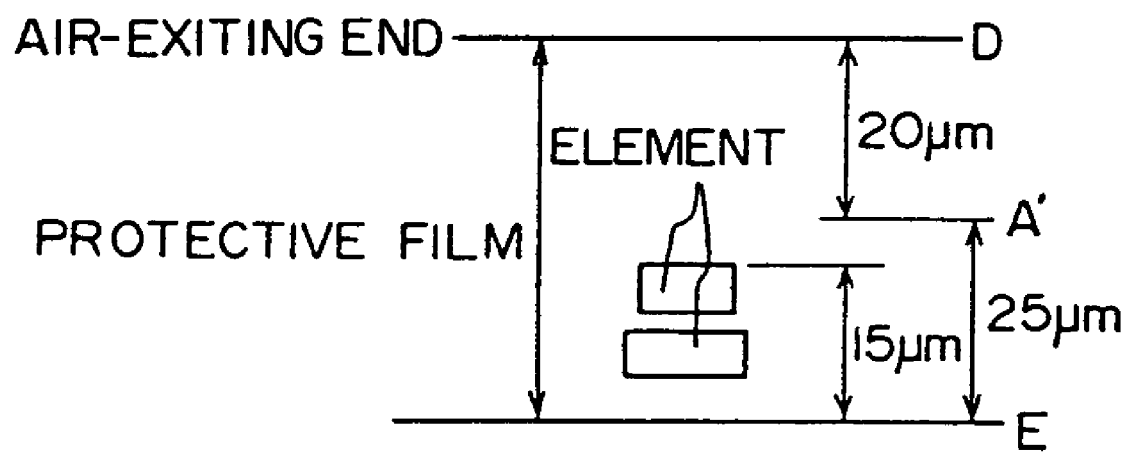
FIG. 8 is a bottom view of the magnetic head.

Assuming that the temperature rise due to the energization of the element is 30° C. at the most, a taper formation resulting in the length A'E of 25 µm gives a satisfactory performance of the magnetic head. FIG. 8 is a bottom view of the magnetic head when A'E =25 µm.

Figure 9:
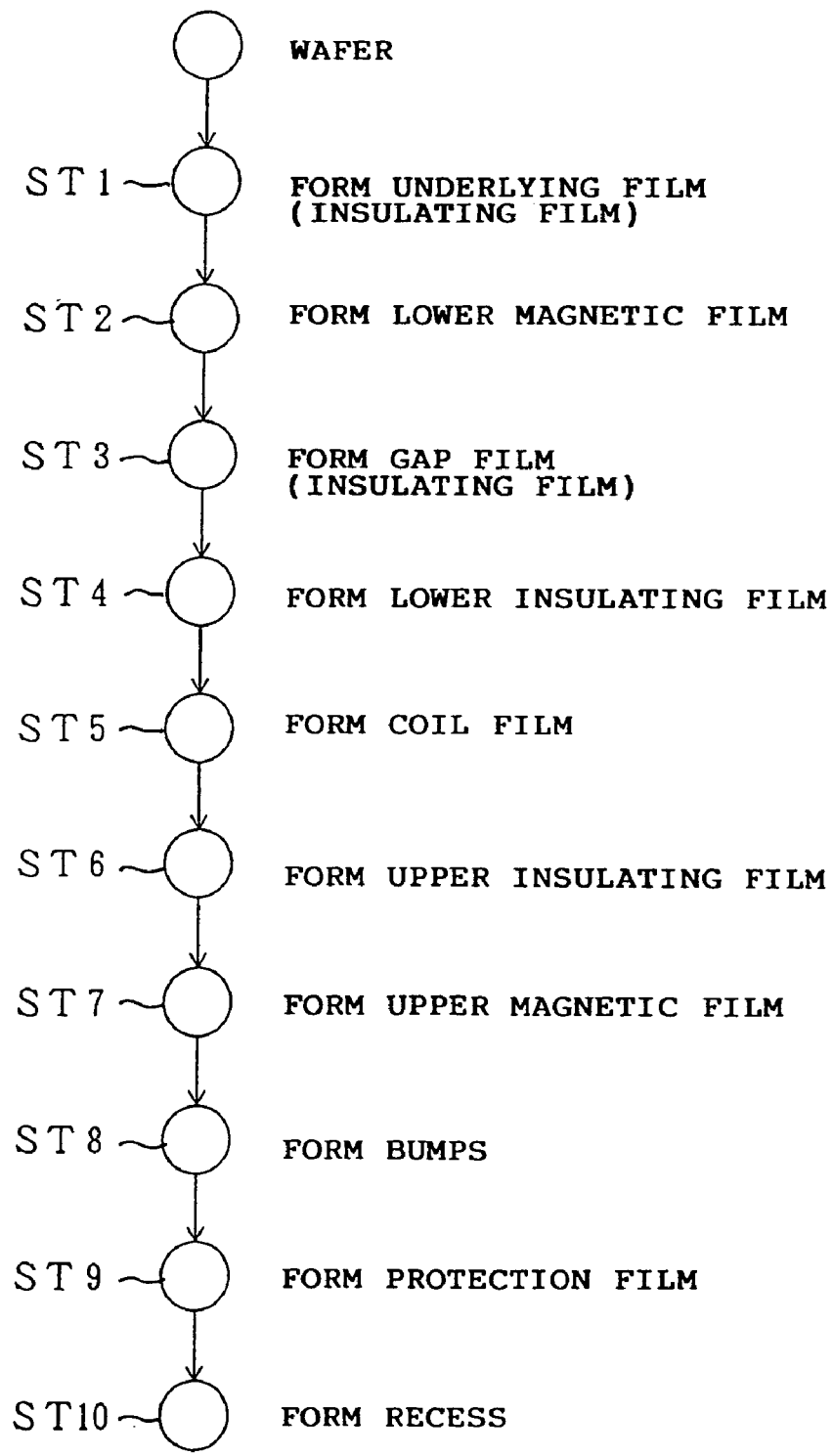
FIG. 9 is a chart explaining a wafer process for producing a thin-film element.
Figure 10A:
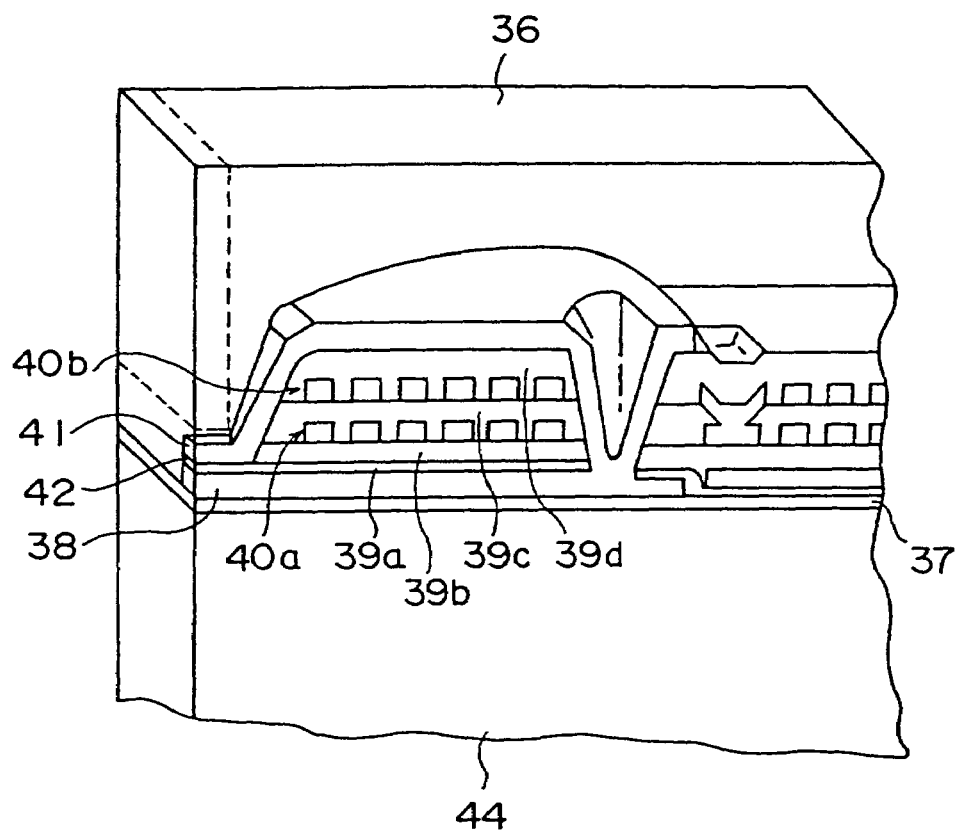
FIGS. 10A and 10B show parts of a thin-film element.
Figure 10B:
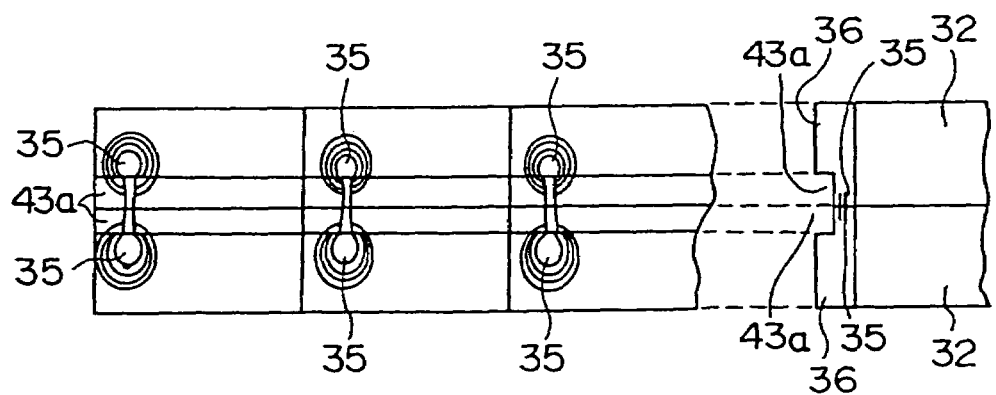

FIG. 9 explains a wafer process for producing a thin-film element, and FIGS. 10A and 10B show parts of the thin-film element. Referring to FIG. 9 and FIGS. 10A/10B, the insulating film 37 is formed, by alumina sputtering, on the surface of a wafer 44 as an underlying film, the thickness of the wafer 44 corresponding to the length of the core slider 32 (ST 1). The lower magnetic film 38 is formed on the insulating film 37 by a subsequent chromium plating process and an etching process (ST 2).

The number of the magnetic films 38 formed depends on the number of thin-film elements 35 formed in the wafer 44. The gaps 42 formed in the magnetic film 38 are linearly arranged.

Subsequently, a gap film 39a is formed on the magnetic film 38 by alumina sputtering and milling (ST 3). A lower insulating film 39b is formed on the gap film 39a by alumina photo etching (ST 4). A coil film 40a is formed on the lower insulating film 39b by chromium sputtering and photo etching (ST 5). When the coil 40 is formed of two layers, an insulating film 39c is formed after ST 4 and ST 5, and lastly an upper coil film 40b is formed. An upper insulating film 39d is formed on the upper coil film 40b by alumina photo etching (ST 6).

An upper magnetic film 41 is formed on the upper insulating film 39d by chromium plating and etching (ST 7). The gap 42 is formed between the upper magnetic film 41 and the lower magnetic film 38, in which gap the gap film 39a is formed.

Bumps serving as lead connecting parts of the magnetic films 38 and 41, and coil films 40a and 40b are formed by chromium sputtering or the like (ST 8). Thus, the thin-film element 35 is completed. The protective film 36 is formed on the entirety of the thin-film element 35 by alumina sputtering (ST 9).

The recess 43a (a broken line in FIG. 10A) is formed by etching the protective film 36 or by grinding the same with a grindstone or the like (ST 10; see FIG. 10B).

Figure 11A:
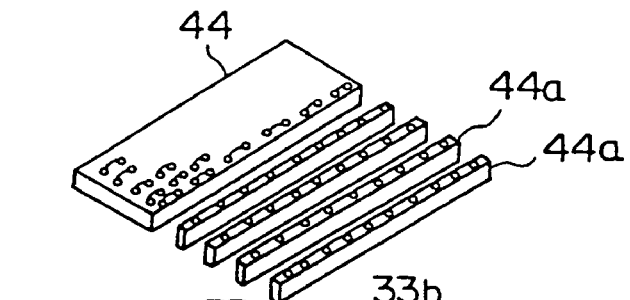
FIGS. 11A, 11B, 11C and 11D explain a fabrication process of the magnetic head and the building of a head assembly.
Figure 11B:
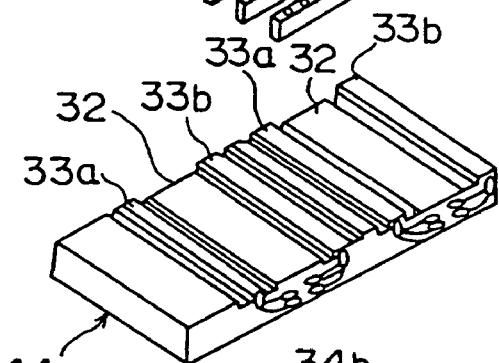
Figure 11C:
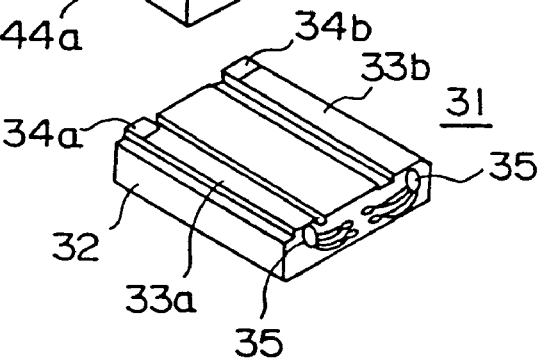
Figure 11D:
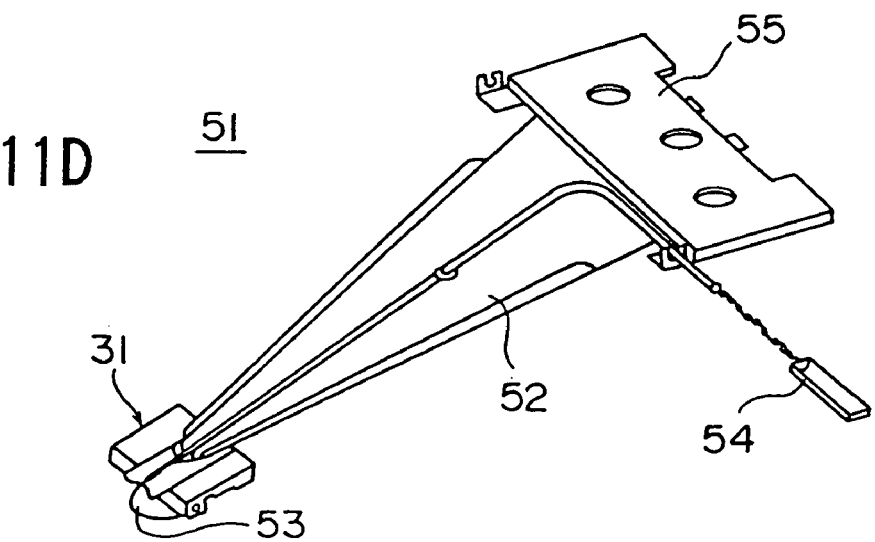
Figure 12A:
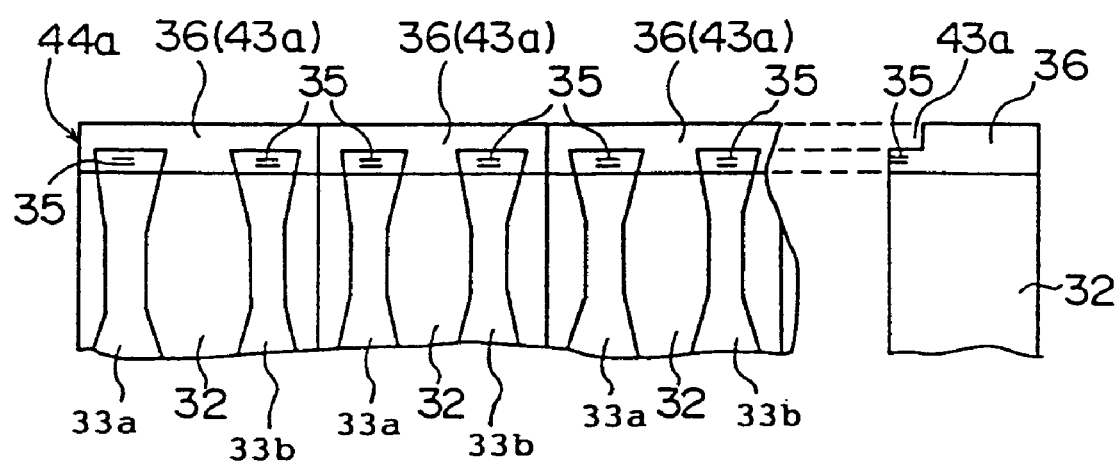
FIGS. 12A and 12B show a part of the wafer in which the thin-film element is formed.
Figure 12B:
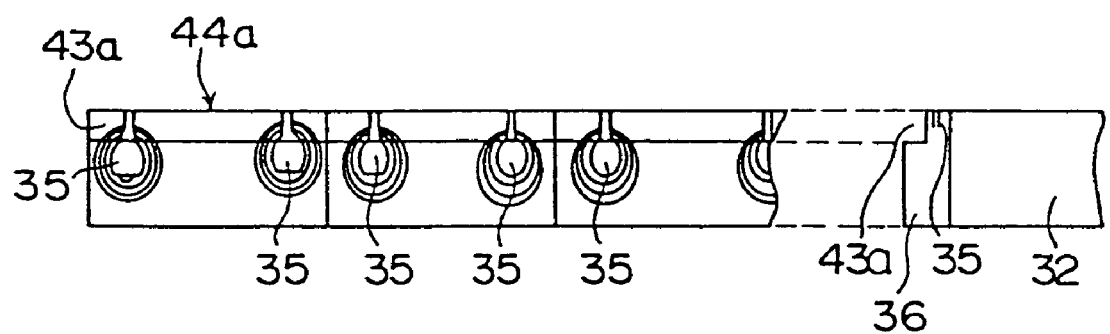

FIGS. 11A, 11B, 11C and 11D explain a fabrication process of the magnetic head and the building of a head assembly, and FIGS. 12A and 12B show a part of the wafer in which the thin-film element is formed.

Referring to 11A, 11B, 11C and 11D, the wafer 44, in which the thin-film element 35 and the protective film 36 (recess 43a) are formed, is cut along a line along which pairs of the gaps 42 of the thin-film element 35 face each other so that a cut wafer piece 44a is produced (FIG. 11A). In the cut wafer piece 44a, the rail surfaces 33a and 33b are formed by grinding (FIG. 11B).

FIGS. 12A and 12B show the cut wafer piece 44a in the state described above. FIG. 12A is a plan view of the wafer piece 44a showing the rail surfaces 33a and 33b, and FIG. 12B is a plan view of the wafer piece 44a showing the end face thereof at which air exits. As shown in FIGS. 12A and 12B, the wafer piece 44a, which has the recess 43a extending in the longitudinal direction, and in which the predetermined number of core sliders 32 are arranged, is cut grounded so that the rail surfaces 33a and 33b having a predetermined height are formed.

Referring to FIGS. 11A, 11B, 11C and 11D, the cut wafer piece 44a, in which the rail surfaces 33a and 33b are formed, is cut to produce the individual magnetic heads 31 (core sliders 32). The tapered surfaces 34a and 34b are formed at respective ends of the rail surfaces 33a and 33b, at which ends air is introduced. As mentioned earlier, chamfering of the rail surfaces 33a and 33b is performed (FIG. 11C).

A head assembly 51 is built such that the magnetic head 31 thus formed is mounted on a gimbal 52 (head supporting part) that supports the head (FIG. 11D). Leads 53 from the aforementioned bumps of the thin-film element 35 of the magnetic head 31 are connected to a connecting terminal 54. The head assembly 51 is mounted on a carriage arm described later via a mounter 55.

Figure 13:
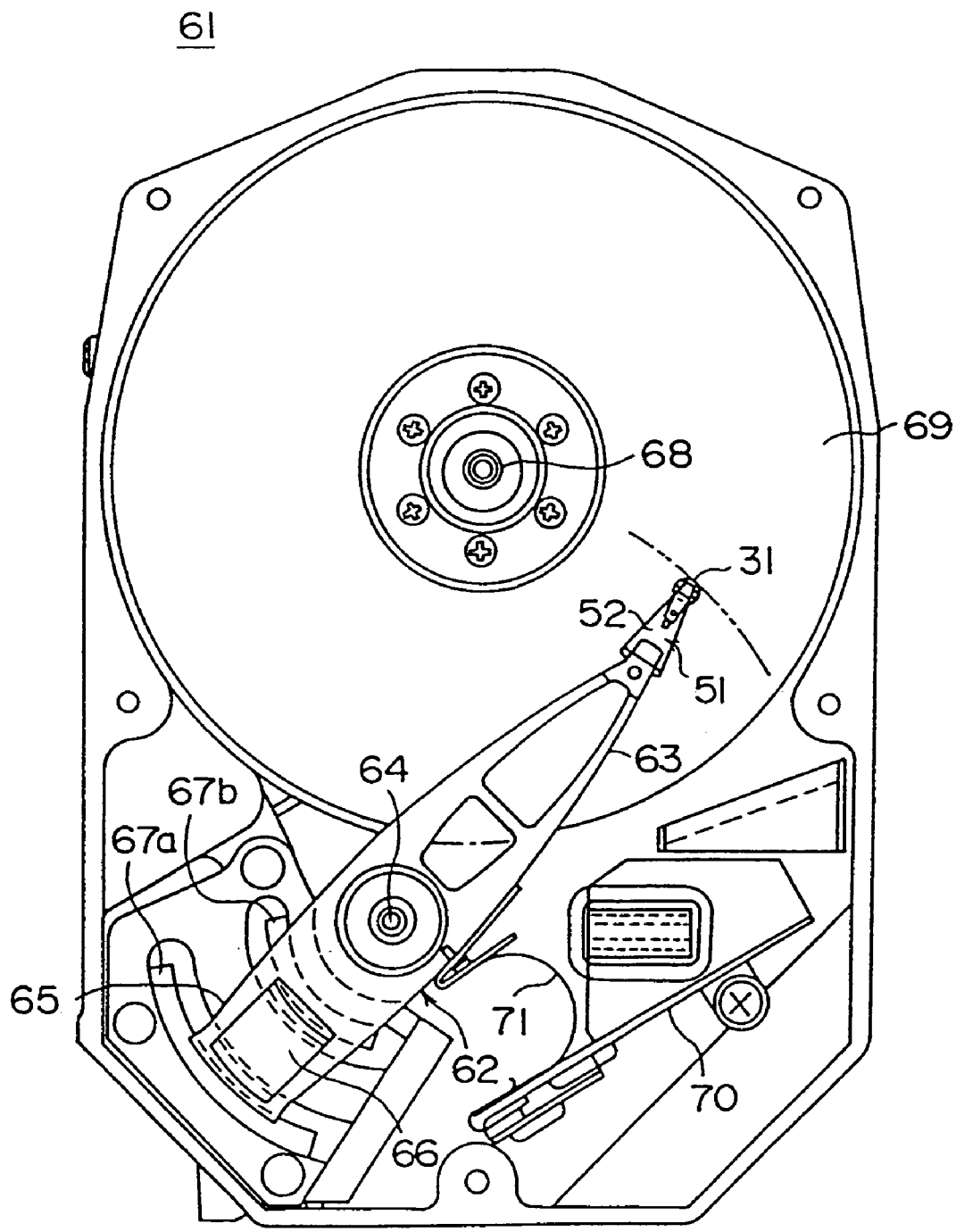
FIG. 13 is a plan view showing a construction of a magnetic disk apparatus in which the magnetic head of FIGS. 3A and 3B is used.

FIG. 13 is a plan view showing a construction of a magnetic disk apparatus 61 in which the magnetic head of FIGS. 3A and 3B is used. In the magnetic disk apparatus 61 shown in FIG. 13, the head assembly 51 is fitted on an arm 63 of an actuator 62, the base of the arm 63 being rotatably supported by a pivot 64.

At a position on the arm 63 further away from the head assembly 51 than that of the pivot 64, there is provided a rotatably supporting part 65, a coil 66 being wound in the rotatably supporting part 65. Two magnets 67a and 67b are fixed under the coil 66. The coil 66 and the magnets 67a and 67b constitute a VCM (voice coil motor) for driving the head.

The actuator 62 of the above construction functions such that the arm 63 is rotated so as to move the magnetic head 31 in a radial direction of a magnetic disk 69 by feeding a current from a wiring substrate 70 to the coil 66 via a flexible printed board 71, the magnetic disk 69 being fixed to a spindle 68 of a spindle motor (not shown) of a sensorless type.

In the magnetic disk apparatus 61 described above, the actuator 62 positions the magnetic head 31 over a predetermined track of the magnetic disk 69 so that the head writes information to the disk or read information therefrom. This positioning is achieved by feeding a current to the coil 40 (coil films 40a, 40b) of the thin-film element 35. When the current is fed to the coil 40, the temperature of the thin-film element 35 rises, resulting in a thermal expansion and a resultant swelling of the protective film 36. However, as indicated by a broken line in FIG. 3B, the swelling takes place in the recess 43a. Hence, only a small degree of swelling occurs near the gap 42. It was experimentally found that the swelling, with reference to an interval having the distance S shown in FIG. 3B, of the protective film 36 measured 2 nm (6 nm in the conventional technology) per temperature rise of 10° C.

Accordingly, it is possible to reduce the chances of contact between the surface of the magnetic disk 69 and the magnetic head 31, with the result that the damage to the magnetic head 31 (thin-film element 35) due to the attachment of abrasion powder thereto is diminished, and the reliability of the apparatus is increased. Consequently, the magnetic head 31 is allowed to approach the surface of the magnetic disk 69 more closely during the operation, that is, a small clearance can be achieved. Moreover, the recess 43a can be easily formed in the wafer that is being processed during production of the magnetic head 31. The presence of the recess 43a reduces the distance between the gap 42 and the end of the protective film 36, thereby affecting the thin-film element 35 less unfavorably than when a recess is formed by chamfering the rail surfaces 33a and 33b according to the conventional process. As a result, variation in the quality of the magnetic head produced can be decreased.

The recess 43a also reduces the chances of the edge of the magnetic head 31 coming into contact with the magnetic disk 69 due to rolling of the magnetic head 31.

Figure 14A:
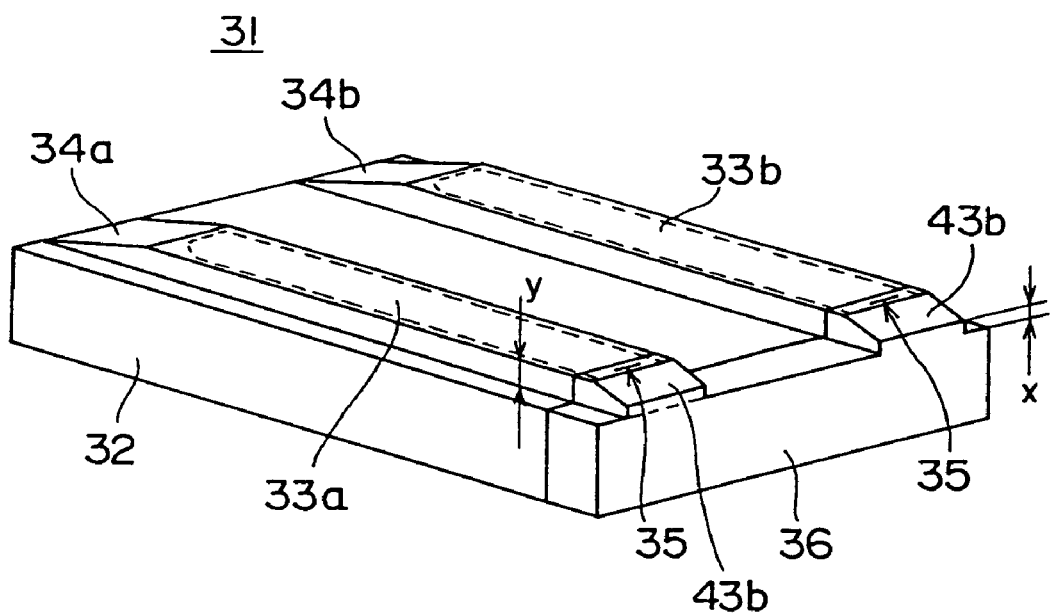
FIGS. 14A and 14B show a construction of a magnetic head of a second embodiment.
Figure 14B:
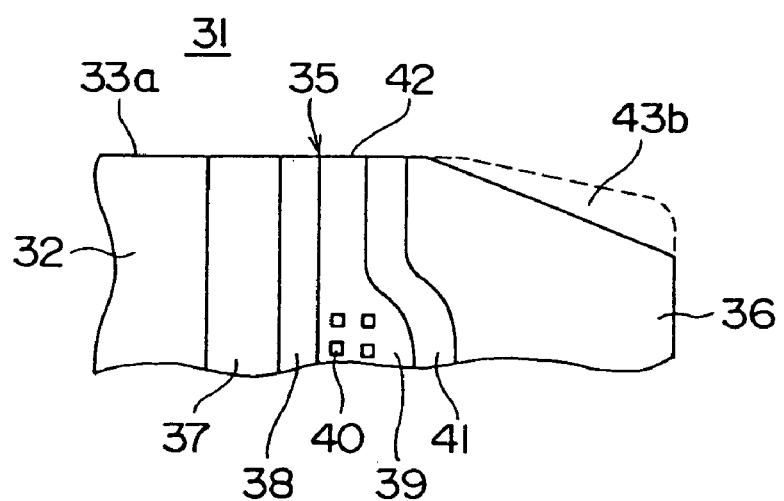

FIGS. 14A and 14B show a construction of the magnetic head according to a second embodiment of the present invention. The magnetic head 31 shown in FIGS. 14A and 14B is constructed such that a tapering recess 43b is formed in each of the rail surfaces 33a and 33b (surfaces which face the disk) of the core slider 32, near the thin-film element 35, the tapering recess 43b extending longitudinally toward an end of each of the rail surfaces at which air exits. The remaining aspects of the construction are the same as those of the first embodiment and have the same effect. The magnetic head 31 shown in FIGS. 14A and 14B is mounted on the magnetic disk apparatus 61 shown in FIG. 11. Typically, the dimension indicated by x is approximately 0.020 mm, and the dimension indicated by y is 0.045 mm.

Figure 15A:
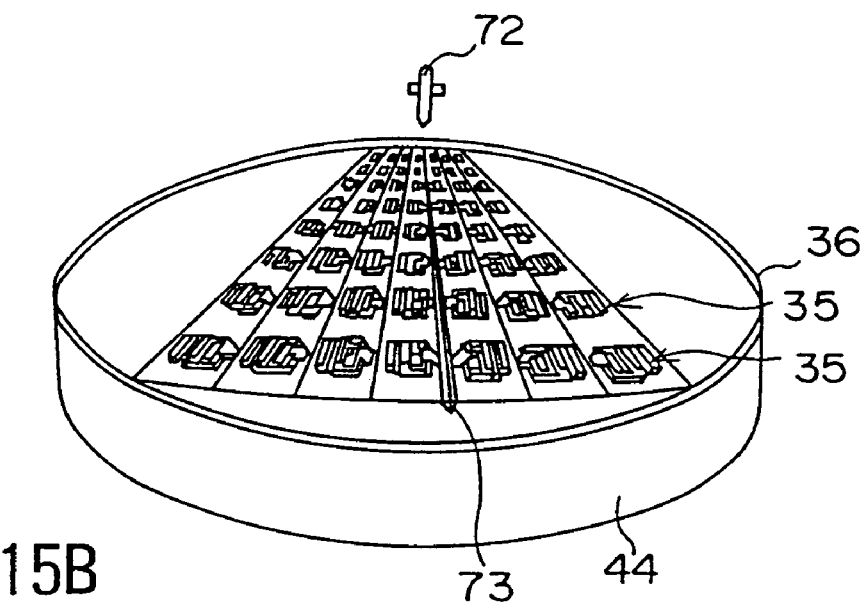
FIGS. 15A and 15B explain production of the magnetic head of the second embodiment.
Figure 15B:
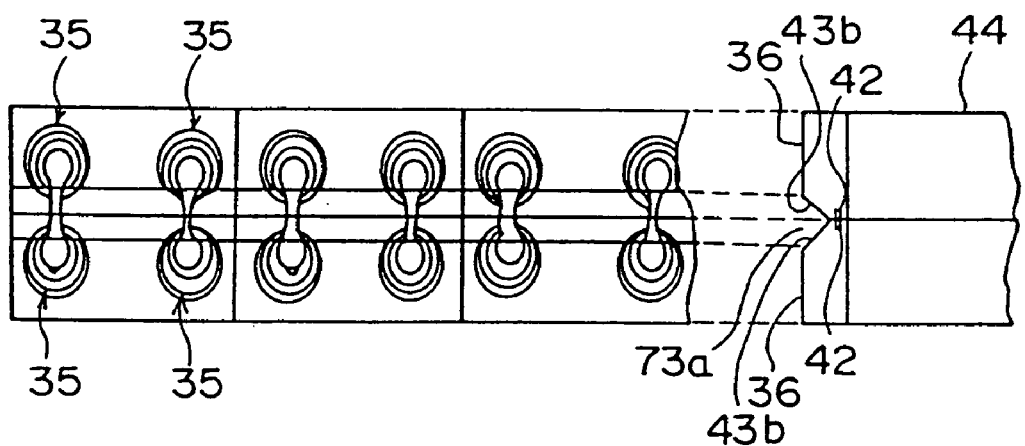

FIGS. 15A and 15B explain how the magnetic head 31 of the second embodiment is produced. Referring to FIGS. 15A and 15B, a predetermined number of the thin-film elements 35 are produced on the wafer 44, similarly to the method explained in FIG. 9, and the protective film 36 is formed on the thin-film elements 35. Thereafter, a groove 73a having a cross section of a letter V is formed near the gap 42 of each of the thin-film elements 35 by means of a blade (grindstone or the like) having a V-shaped cross section. For example, the wafer is fixed on a stage, whereupon a grindstone held by a robot hand is moved, in the transversal direction, and positioned at a part of each block of the wafer, at which part the thin-film element is formed, the positioning being done by sensing marks. The grindstone is driven in the longitudinal direction of the wafer so as to form the groove 73a.

By cutting the wafer 44 along the groove 73a having a cross section of a letter V, the tapering recess 43b as shown in FIGS. 14A and 14B is formed to extend from the neighborhood of the thin-film element 35 to the protective film 36.

Thus, the tapering recess 43b can be easily formed in the wafer that is being processed by the blade 72.

In this construction, when the magnetic head 31 is driven by feeding a current to the coil, the temperature may rise and the protective film 36 may undergo a thermal expansion. However, only a small degree of swelling of the protective film 36 on the rail surfaces 33a and 33b (the gap 42) results, as indicated by a broken line in FIG. 14B. Therefore, it is possible to achieve a small clearance of the magnetic head 31.

Figure 16A:
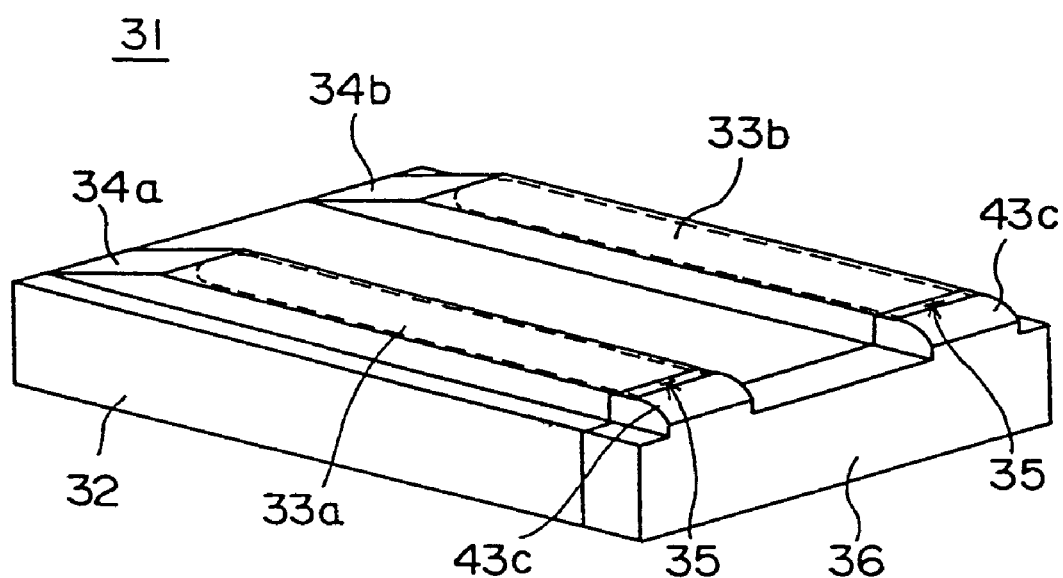
FIGS. 16A and 16B show a construction of a magnetic head of a third embodiment.
Figure 16B:
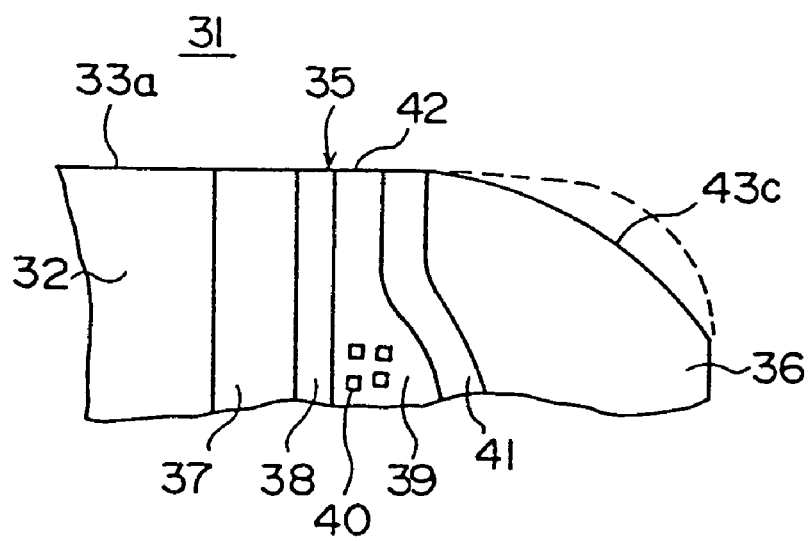
Figure 17:
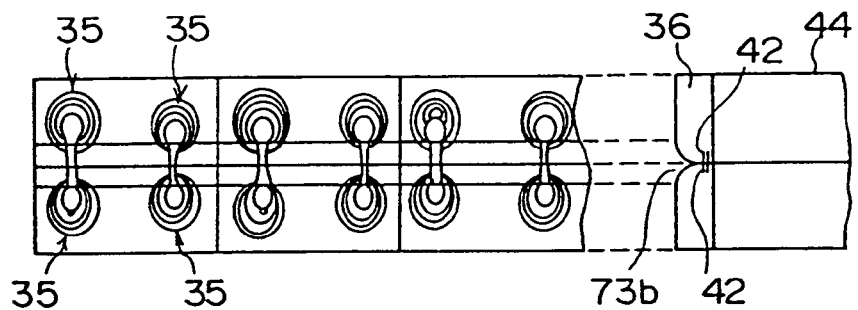
FIG. 17 explains a shape of a groove of the magnetic head of the third embodiment.

FIGS. 16A and 16B show a construction of the magnetic head of a third embodiment of the present invention, and FIG. 17 explains a shape of a groove of the third embodiment. The magnetic head 31 shown in FIGS. 16A and 16B is constructed such that a curved recess 43c is formed in each of the rail surfaces 33a and 33b (surfaces which face the disk) of the core slider 32, near the thin-film element 35, the curved recess 43c extending longitudinally toward an end of each of the rail surfaces at which air exits. The remaining aspects of the construction are the same as those of the first embodiment and have the same effect. The magnetic head 31 shown in FIGS. 16A and 16B is mounted on the magnetic disk apparatus 61 shown in FIG. 13.

As shown in FIG. 17, a groove 73b having a cross section of an inverted letter R is formed by a blade having a curved cross section, near the gap 42 of each thin-film element 35. By cutting the wafer along the center line of the groove 73b, the recess 43c having a cross section of an inverted letter R is formed in the protective film 36.

By forming the recess 43c, only a small degree of swelling of the protective film 36 on the rail surfaces 33a and 33b (the surfaces that face the disk) due to a thermal expansion results, as indicated by a broken line in FIG. 16B. Therefore, it is possible to achieve a small clearance of the magnetic head 31.

Figure 18A:
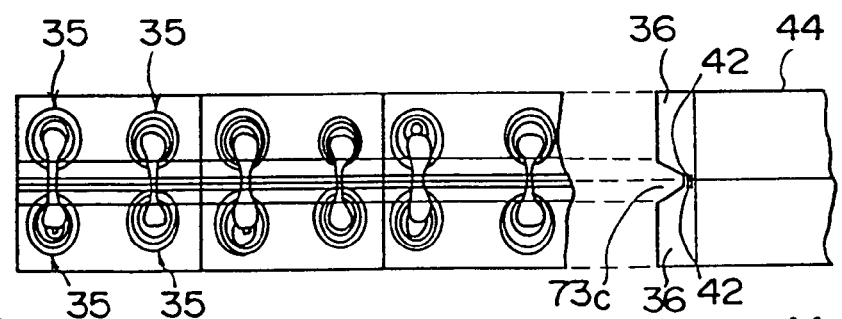
FIGS. 18A and 18B explain other shapes of the groove of the first through third embodiments.
Figure 18B:
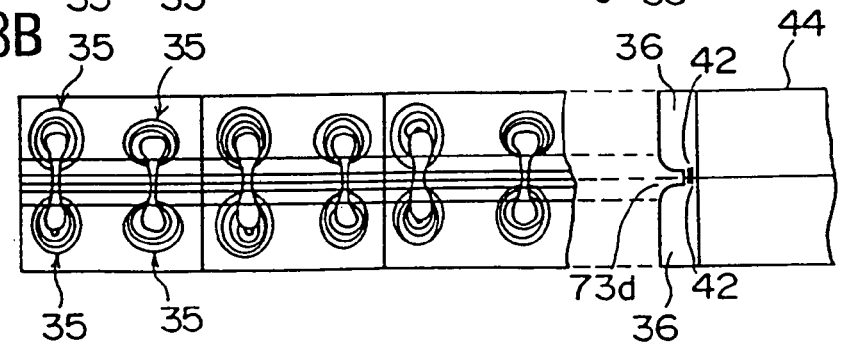

FIGS. 18A and 18B explain other possible configurations of the groove in the first through third embodiments. FIG. 18A shows a case where a blade having a cross section of an inverted trapezoid is applied to the wafer being processed so as to form a groove 73c having a cross section of an inverted trapezoid, near the gap 42 of the thin-film element 35. By cutting the wafer along the center line of the groove 73c having a cross section of an inverted trapezoid, a tapering recess is formed in the protective film 36.

FIG. 18B shows a case where a blade is applied to the wafer being processed so as to form a groove 73d having a flat bottom and a cross section of an inverted letter R, near the gap 42. By cutting the wafer at the center line of the groove 73d, the recess having a cross section of an inverted letter R is formed in the protective film 36.

Figure 19A:
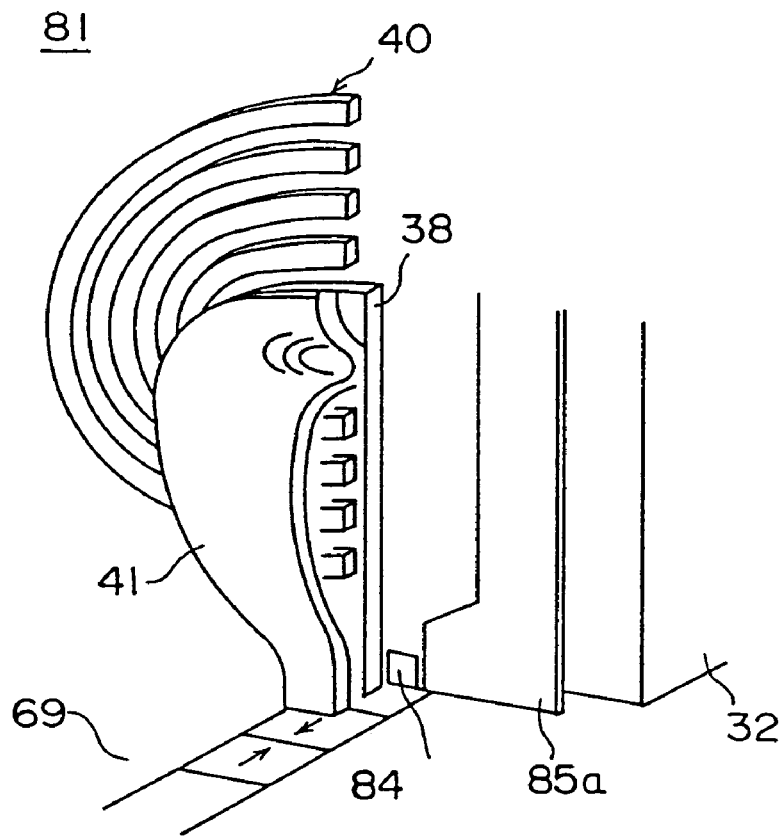
FIGS. 19A and 19B are schematic diagrams of a construction in which a magnetic head is constructed of a thin-film MR element.
Figure 19B:
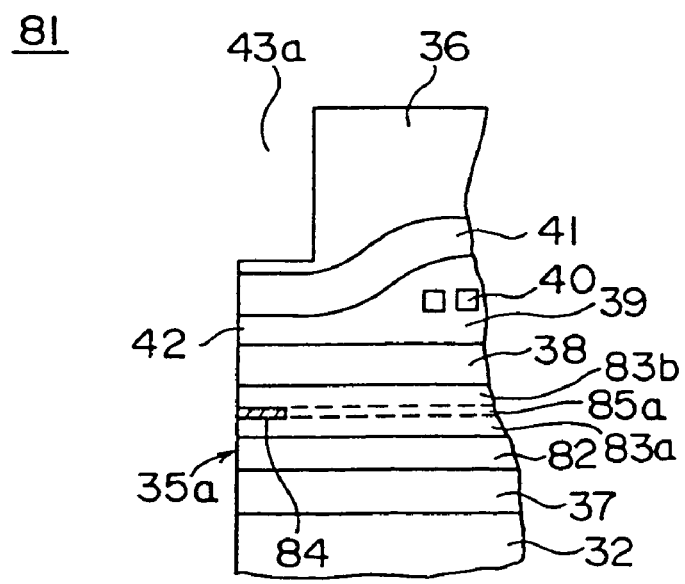

FIGS. 19A and 19B show a construction of the magnetic head in which a thin-film MR element is used. FIG. 19A shows a construction of a part of the magnetic head, FIG. 19B being a partial cross sectional view thereof. A magnetic head 81 shown in FIGS. 19A and 19B is configured such that the insulating film 37 of alumina or the like is formed as an underlying layer on the core slider 32, a shield film 82 (magnetic film) of FeMn (manganese iron) or the like is formed on the insulating film 37, and an insulating film 83a of alumina or the like is formed on the film 82.

An MR element (magnetoresistant effect element) 84 and conductive members 85a and 85b (the member 85b is not shown in the figure) connected to respective ends of the MR element 84 are formed on the insulating film 83a. An insulating film 83b is formed on the MR element 84 and the conductive members 85a and 85b.

The lower magnetic film 38 serving as a shield film is formed on the insulating film 83b. Similarly to the magnetic head of FIGS. 3A and 3B, the insulating film 39, the coil 40 and the upper magnetic film 41 are formed on the magnetic film 38. Thus, the thin-film element 35 is completed. The protective film 36 is formed on the thin-film element 35. The step-like recess 43a is formed on the protective film 36. The recess 43a may have a tapering or curved cross section.

In the magnetic head 81 of the above construction, the gap 42 in the thin-film element 35 serves as an element for recording information, and the MR element 84 serves as an element for reproducing information.

Thus, even in the case where the MR element 84 is used, the recess 43a formed in the protective film 36 reduces the chances of the magnetic head 81 coming into contact with the magnetic disk 69 when the temperature rises. Consequently, it is possible to achieve a small clearance of the magnetic head 81.

The MR element 84 may also be used in a fourth embodiment described below.

Figure 1A:
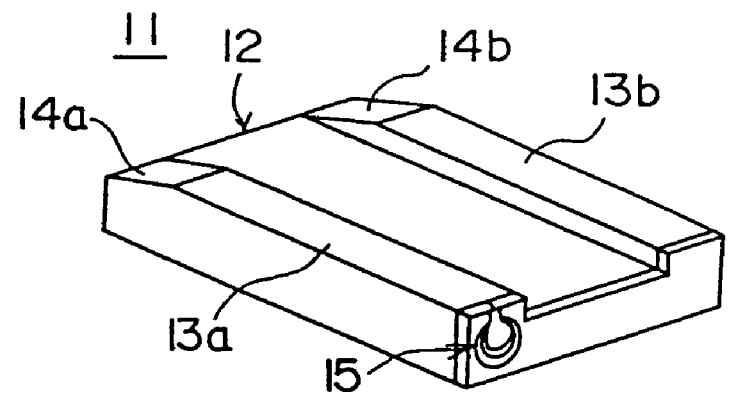
FIGS. 1A, 1B and 1C show a construction of a conventional magnetic head.
Figure 1B:
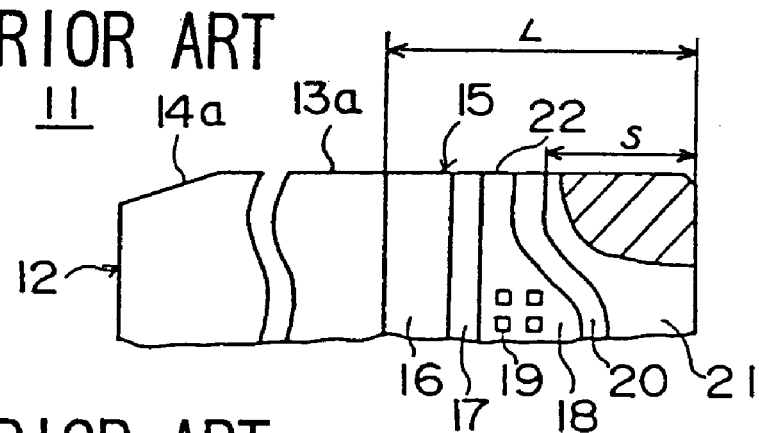
Figure 1C:
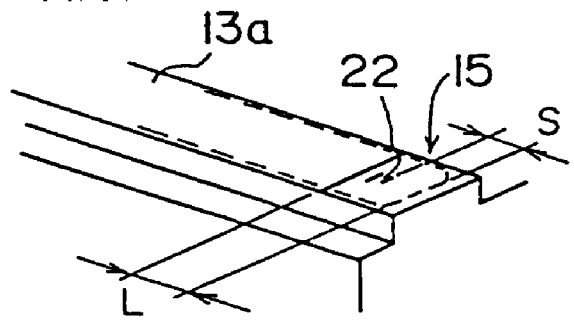
Figure 2:
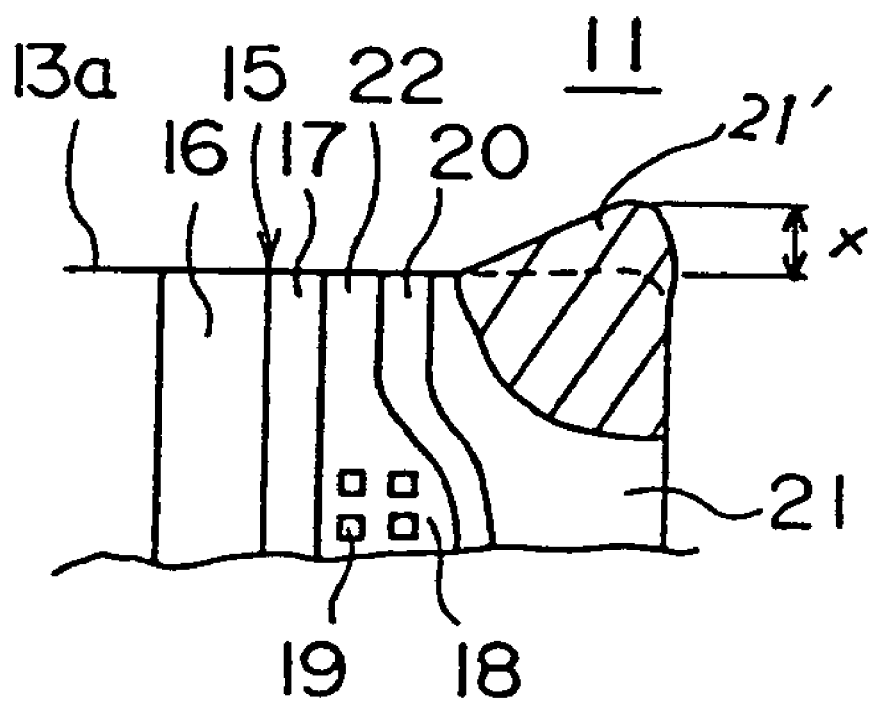
FIG. 2 explains thermal expansion of a protective film of a conventional magnetic head.
Figures 20A, 20B, 20C:
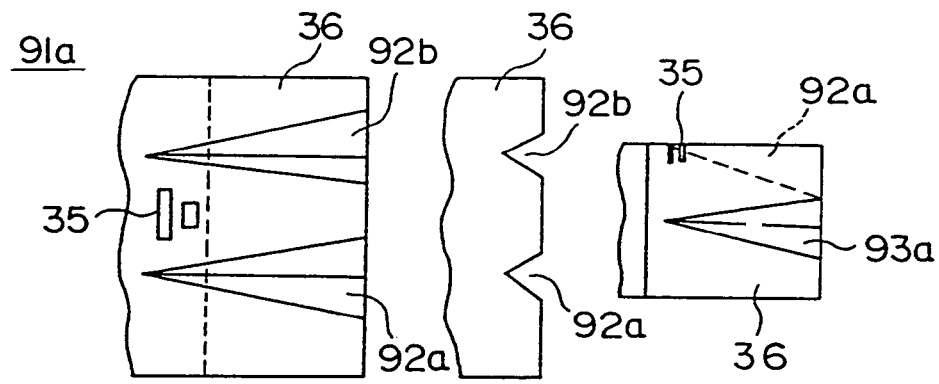
FIGS. 20A, 20B and 20C show a construction of a part of a magnetic head of a fourth embodiment of the present invention.

FIGS. 20A, 20B and 20C show a construction of a part of the fourth embodiment of the present invention. FIG. 20A is a plan view of the part including a thin-film element, FIG. 20B is a rear view of an end face of the protective film, and FIG. 20C is a side view of the part including the thin-film element. A magnetic head 91a shown in FIGS. 20A–20C has a construction similar to that shown in FIG. 1A. However, the protective film 36 is formed on the thin-film element 35, and two grooves 92a and 92b having a cross section of a letter V are formed to extend from the neighborhood of the thin-film element 35 to the end of the protective film 36, at which end air exits, the grooves 92a and 92b becoming increasingly deeper as they approach toward the end of the protective film 36. Further, as shown in FIG. 20C, two grooves 93a and 93b (the groove 93b is not shown in the figure) having a cross section of a letter V are formed at the respective sides of the end of the protective film 36 so as to extend toward the end of the protective film, at which end air exits, the grooves 93a and 93b becoming increasingly deeper as they approach toward the end of the protective film 36. The magnetic head 91a is mounted on the magnetic disk apparatus 61 shown in FIG. 13.

The above construction, in which the grooves 92a and 92b are formed on the surface of the protective film 36, which surface faces the disk, and the grooves 93a and 93b are formed on the sides of the protective film 36, ensures that the cooling effect is improved, that the surface area near the thin-film element 35 is increased, and that only a small degree of swelling, induced by the temperature rise, of the protective film 36 occurs in the surface thereof facing the disk. Accordingly, it is possible to achieve a small clearance of the magnetic head 91*a* with respect to the magnetic disk.

Figures 21A, 21B:
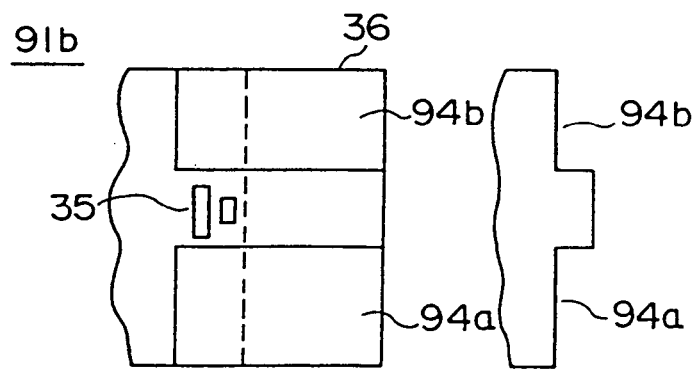
FIGS. 21A, 21B and 21C show other shapes of grooves of the magnetic head of the fourth embodiment.
Figure 21C:
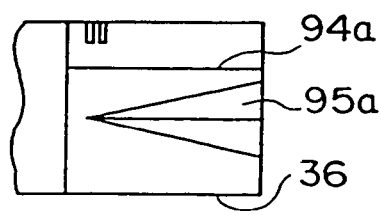

FIGS. 21A, 21B and 21C show another possible configuration of the grooves in the fourth embodiment. FIG. 21A is a plan view of a part including the thin-film element, FIG. 21B is a rear view of the end face of the protective film, and FIG. 21C is a side view of the part including the thin-film element.

The magnetic head 91*b* shown in FIGS. 21A, 21B and 21C is constructed such that step-like recesses 94*a* and 94*b* are formed by mask ion milling or the like so as to extend along both sides of the thin-film element 35 from the neighborhood of the thin-film element 35 to the end of the protective film 36, at which end air exits. Further, as shown in FIG. 21C, grooves 95*a* and 95*b* (the groove 95*b* is not shown in the figure) having a cross section of a letter V are formed, for example, by grinding, on the sides of the protective film 36, the grooves 95*a* and 95*b* becoming increasingly deeper as they approach toward the end of the protective film 36.

The steps 94*a* and 94*b* and the grooves 95*a* and 95*b* on both sides of the film 36 ensure that the surface area near the thin-film element 35 is increased, that the cooling effect is increased, and that only a small degree of swelling, induced by the temperature rise, of the protective film 36 occurs in the surface thereof facing the disk. Accordingly, it is possible to achieve a small clearance of the magnetic head 92*b* with respect to the magnetic disk.

While the fourth embodiment has been described assuming that the grooves 92*a*, 92*b*, 93*a*, 93*b*, 95*a*, and 95*b* having a cross section of a letter V and steps 94*a* and 94*b* are formed to extend from the neighborhood of the thin-film element 35 to the protective film 36, any configuration is acceptable as long as the requirement of increasing the surface area is met.

By combining the fourth embodiment shown in FIGS. 20A–20C and 21A–21C with the first through third embodiments, it is possible to achieve an even small clearance of the magnetic head.

A description will be given of fifth through ninth embodiments of the present invention. The fifth through ninth embodiments are further improvements in the MR head. In order to facilitate understanding of the fifth through ninth embodiments of the present invention, related prior art will be described below.

The MR head has an inherent problem in which an abnormal signal is output due to a thermal asperity. This problem should be eliminated. Further, an increase in the recording density due to recent developments decreases the amount (height) of the floating of the MR head with respect to the recording disk. As the amount of the floating of the MR head decreases, the abnormal signal due to the thermal asperity is increased. An increase of the abnormal signal due to the thermal asperity should be eliminated.

Figure 22A:
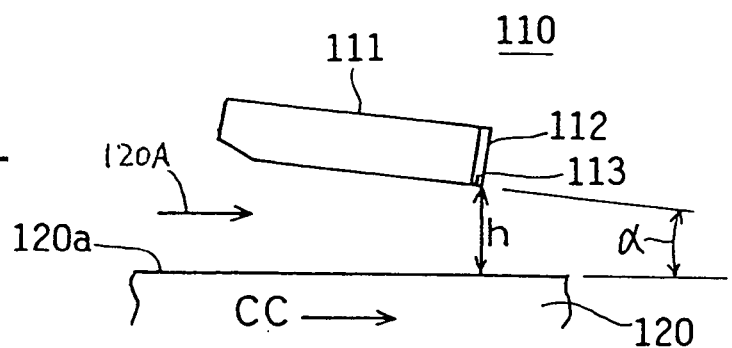
FIGS. 22A, 22B and 22C are respectively diagrams of a conventional MR head.
Figure 22B:
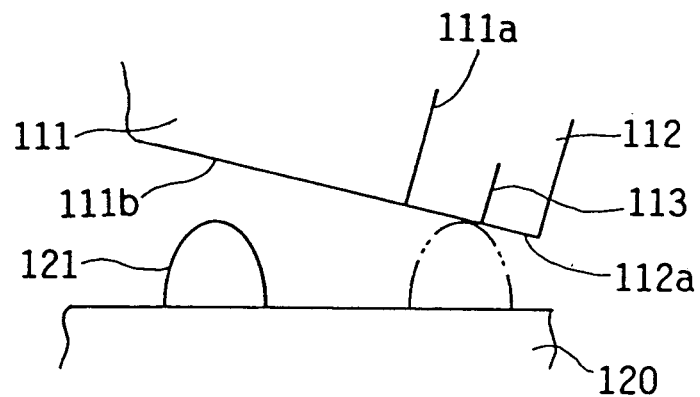

FIGS. 22A and 22B show a conventional MR head 110, which includes a slider 111 and a film structure part 112 located on an air outflow end surface 111*a* of the slider 111. The film structure part 112 has an MR element 113. An end surface 112*a* of the film structure part 112 is located on an extension of a floating surface 111*b* of the slider 111*b*. That is, the end surface 112*a* of the film structure part 112 continues to the floating surface 111*b*.

When a magnetic disk 120 is rotated in a direction indicated by an arrow CC, the MR head 110 continues to float over an upper surface 120*a* of the magnetic disk 120 due to an air flow 120A so that the MR head 110 is located at a floating height h and is inclined at an angle α so that the side of the head on which the element 113 is located is closer to the magnetic disk 120 than the air inflow end surface of the slider 111. In the above floating state, the MR head 110 reads a signal recorded on the magnetic disk 120.

Generally, the magnetic disk has a substrate having a surface which is subjected to texturing in order to prevent the magnetic head from being sucked to the magnetic disk when the magnetic head starts to relatively move from a state in which the magnetic head is in contact with the magnetic disk. A film is formed on the textured surface of the substrate. A roughness Ra formed on the textured surface of the magnetic disk is approximately equal to 10 to 50 Å, so that the MR head in the floating state does not come into contact with the magnetic disk.

The textured surface of the magnetic disk can be formed by a mechanical process or by using a laser beam. In practice, as shown in FIG. 22B, a fine projection 121 protruding from the upper surface 120*a* is formed.

The amount h of the floating of the MR head is as small as 30–50 nm due to an increase in the recording density. As shown by a two-dot chained line shown in FIG. 22B, the fine projection 121 may hit the end surface 12*a* of the film structure part 112. Further, if a magnitude Nh of a deformed convex portion expansion of the film structure part 112 due to the thermal asperity is approximately equal to 5 nm, the fine projection 121 may more frequently hit the end surface 12*a* of the film structure part 112. The magnitude Nh of the expansion of the film structure part will be described in detail later with reference to FIG. 28B.

Figure 22C:
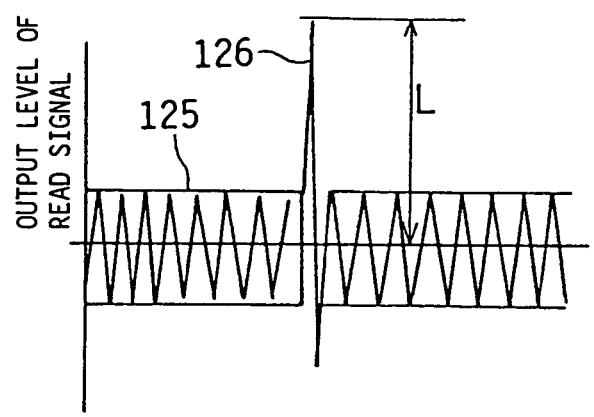

If the fine projection 121 hits the MR element 113 on the end surface 112*a* of the film structure part 112, the MR element 113 will be temporarily heated, and the resistance value thereof will be temporarily changed. Thus, as shown in FIG. 22C, an abnormal signal 126 is superimposed on a read signal 25. The abnormal signal 126 is caused by the thermal asperity.

A conventional measure to counter the thermal asperity is to improve the quality of the surface of the magnetic disk or provide a signal processing circuit which suppresses the abnormal signal due to the thermal asperity.

If the amount h of the floating of the MR head decreases, the fine projection 121 will hit the end surface 112*a* of the film structure part 112 more strongly, and thus the output level L (shown in FIG. 22C) of the abnormal signal 126 will be increased. In this case, the conventional countermeasure does not suppress an increase in the output level L of the abnormal signal effectively.

Hence, the fifth through the ninth embodiments of the present invention are to provide an MR head and a magnetic disk apparatus equipped with the same in which the MR head has an improved structure which makes it possible for a fine projection on the magnetic disk to hit the MR head without causing an abnormal reproduction signal.

Figure 23:
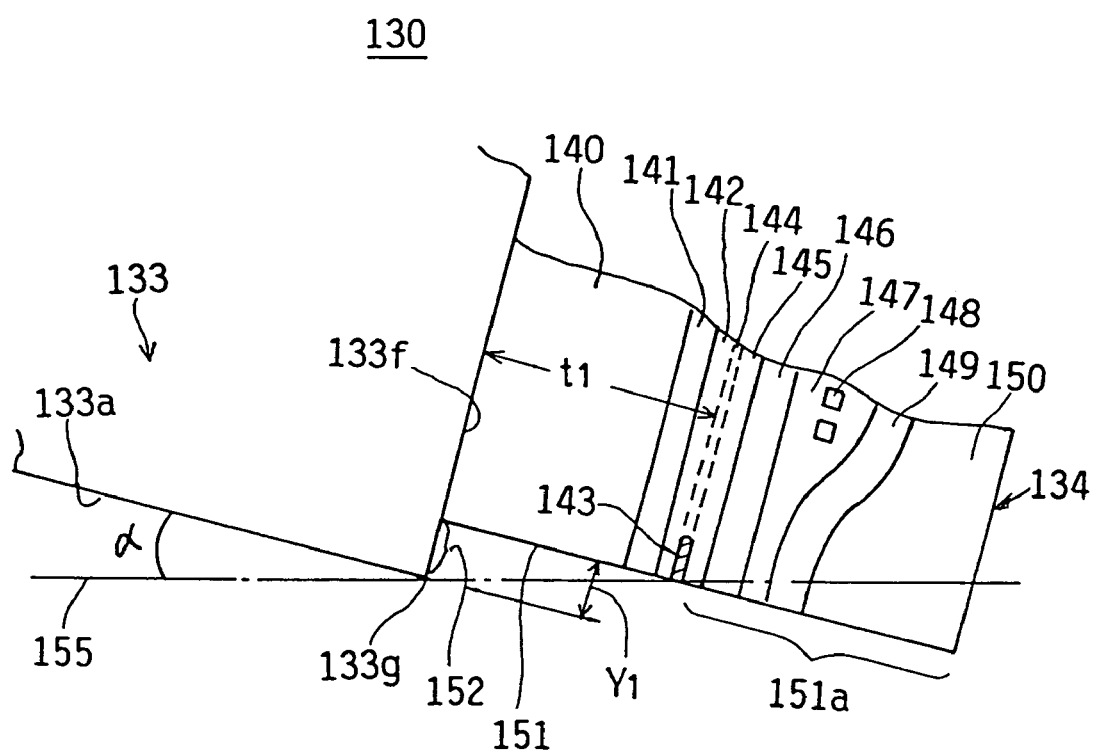
FIG. 23 is an enlarged side view of an MR head according to a fifth embodiment of the present invention.
Figure 24A:
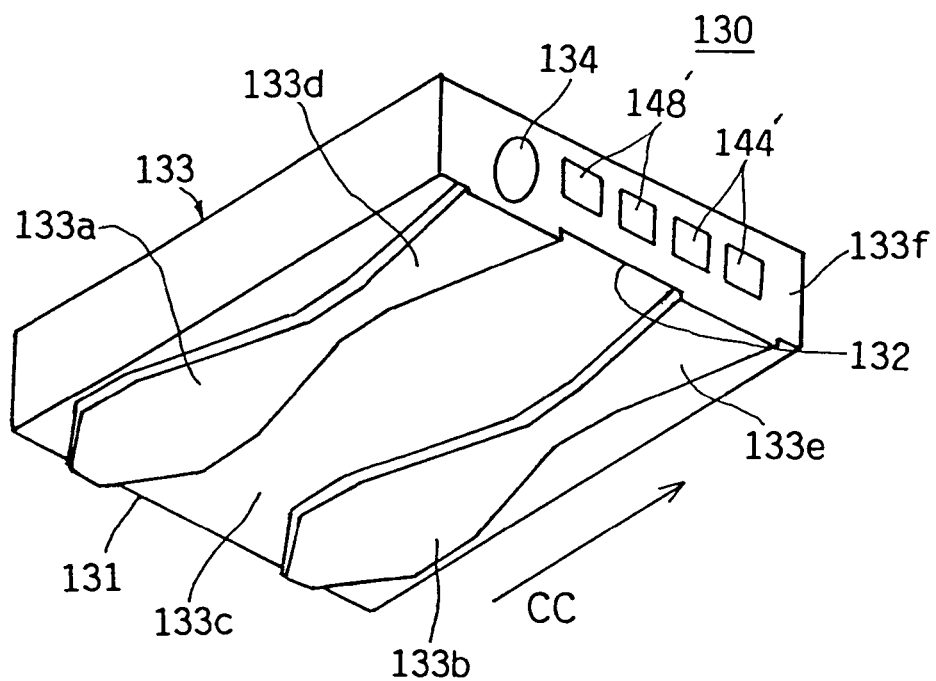
FIG. 24A is a perspective view of the MR head according to the fifth embodiment of the present invention.
Figure 24B:
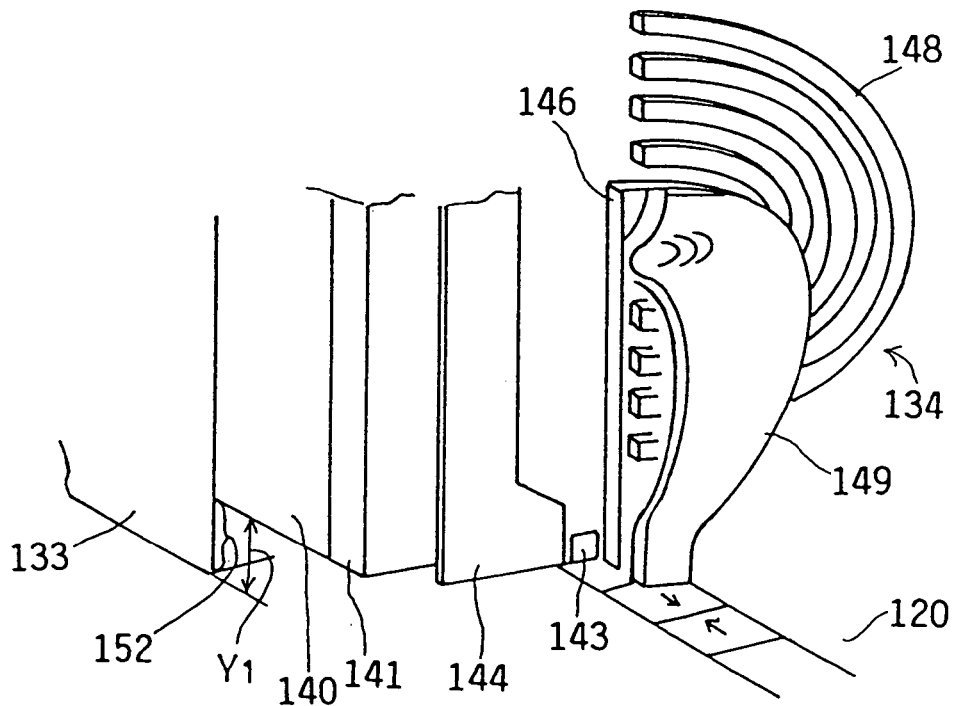
FIG. 24B is a partially cutout perspective view of the MR head according to the fifth embodiment of the present invention.

FIGS. 23, 24A and 24B show an MR head 130 according to a fifth embodiment of the present invention. The arrow CC shown in FIG. 24A indicates the direction of flow of air.

The MR head 130 includes an air inflow end 131, and an air outflow end 132. The MR head 130 has a slider 133 and a film structure part 134. The slider 133 is made of, for example, $Al_2O_3$ or TiC, and has a block-shaped structure. The film structure part 134 is formed by a process of producing a film in the semiconductor field. The slider 133 has a lower surface, which faces a magnetic disk in a magnetic disk apparatus in which the MR head 130 is provided. The lower surface has two rails 133*a* and 133*b*, and a shallow recess portion 133*c* located between the rails 133a and 133b. The rails 133a and 133b and the recess portion 133c extend in the direction CC. The respective lower surfaces 133d and 133e of the rails 133a and 133b function as floating surfaces. An edge 133g (FIG. 23) is defined by the floating surface 133f and a surface 133d of the air outflow end 132.

The film structure part 134 is located on the surface 133f of the air outflow end 132 and is located on the side of the rail 133a. As shown in FIG. 23, the film structure part 134 includes a stacked structure, in which stacked are an insulating film 140, a lower shield film 141, an insulating film 142, an MR element 143, electrically conductive members 144 (only one member 144 appears in the figure), an insulating film 145, a lower magnetic film 146, an insulating film 147, a film-shaped coil 148, an upper magnetic film 149 and a protection film 150. The insulating film 140, which serves as an underlying layer, is made of, for example, alumina, and is provided on the surface 133f of the slider 133. The lower shield film 141 is made of, for example, FeN (ferri nitride). The insulating films 142 and 145 are made of, for example, alumina. The element 143 has a film shape. The conductive members 144 have a film shape, and are electrically connected to the respective ends of the element 143. The lower magnetic film 146 functions as a shield film.

The ends of the conductive elements 144 other than the ends thereof connected to the MR element 143 are exposed as terminal parts 144' of the MR element 143. The ends of the coil 148 are exposed as terminal parts 148' of an inductive head. The terminal parts 144' and 148' are soldered to lead lines, which are also connected to a head IC for driving the heads provided in the magnetic disk apparatus shown in FIG. 13.

The magnetic disk apparatus 61 can include a plurality of magnetic disks arranged in a stacked formation. In this case, a plurality of pivoting arms equipped with MR heads are respectively provided for the magnetic disks.

The film structure part 134 has an end surface 151 located on the same side as that of the floating surface 133d.

The lower magnetic film 146, the insulating film 147, the film-shaped coil 148 and the upper magnetic film 149 form a recording dedicated element. The MR element 143 functions as a reproduction dedicated element. The end surface 151 is lower than the floating surface 133d so that the end surface 151 has a step-like recess 152 having a step size (depth) Y1 shown in FIG. 23. The end surface 151 is parallel to the floating surface 133d. The step-like recess 152 can be formed by a mechanical polishing process using an appropriate stone or a polishing process such as ion trimming.

The depth of the step-like recess 152, that is, the step size Y1 is selected so that it satisfies the following condition:

$$Y1 \geq t1 \times \tan \alpha$$

where t1 is the distance between the surface 133f of the slider 133 and the MR element 143, and α is the floating angle (radian) of the MR head 130. The above distance corresponds to the sum of the thicknesses of the insulating film 140, the lower shield film (magnetic film) 141 and the insulating film 142.

The floating angle of the MR head 130 is, for example, 0.20 radian, and the distance t1 is, for example, 10 μm. In this case, the step size Y1 is approximately 2 μm.

FIG. 23 shows a state in which the MR head 130 is inclined at the floating angle α. An imaginary plane 155 will now be considered which passes on the edge 133g and is parallel to the magnetic disk. In this state, the step size Y1 contributes to positioning the end portion of the MR element 143 over the imaginary plane 155.

A description will now be given, with reference to FIGS. 25A through 25G, of the function of the step-like recess 152 of the MR head 130 in operation of the magnetic disk apparatus 161.

Figure 25A:
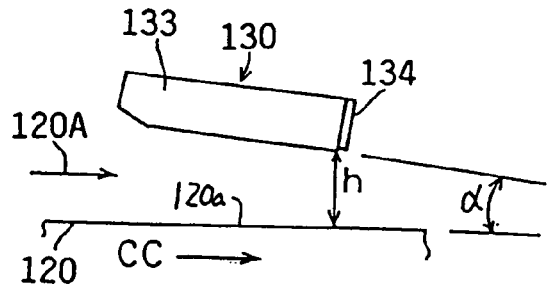
FIGS. 25A, 25B, 25C, 25D, 25E, 25F and 25G are diagrams showing a function of a step-like recess formed in the MR head according to the fifth embodiment of the present invention.

As shown in FIG. 25A, a flow of air 120A is caused when the magnetic disk 120 is rotated in the direction CC. The MR head 130 is made float over the upper surface 120a of the magnetic disk 120 due to the function of the flow 121 of air. In this state, the MR head 130 has the amount h of floating, and is inclined at the floating angle α so that the rear side of the MR head 130 on which the MR element 143 is located is closer to the magnetic disk 120 than the front side thereof. In this state, a desired track formed on the magnetic disk 120 can be accessed and information can be read therefrom or recorded thereon via the MR head 130.

Figure 25B:
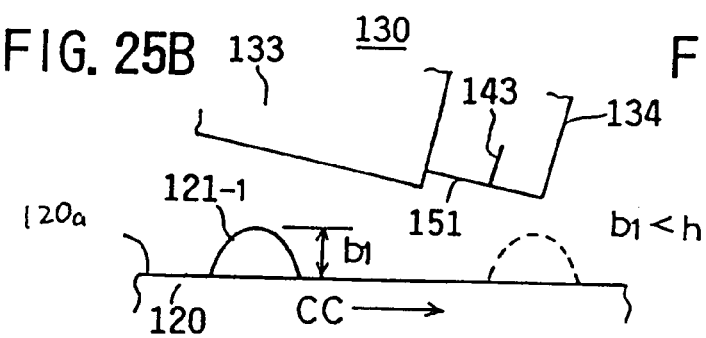
Figure 25C:
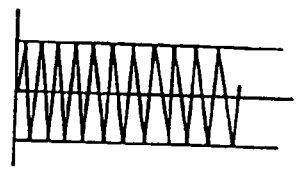
Figure 25D:
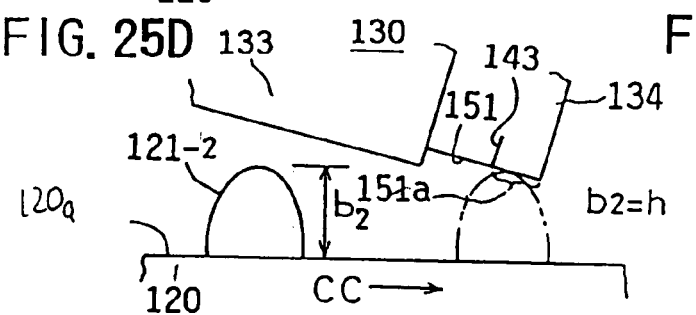
Figure 25E:
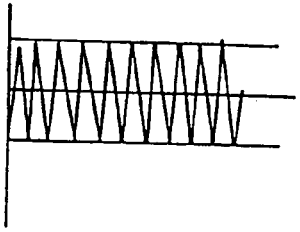
Figure 25F:
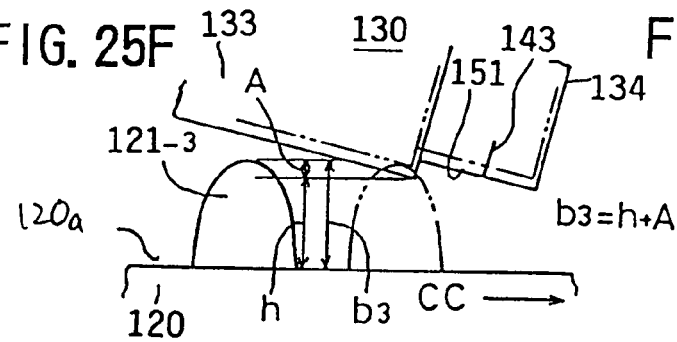

As shown in FIGS. 25B, 25D and 25F, in practice, fine projections 121-1, 121-2 and 121-3 having different sizes may be formed on the upper surface 120a of the magnetic disk 120 during the production process. The fine projection 121-1 has a height b1, which is less than the amount (height) h of floating, as shown in FIG. 25B. The fine projection 121-2 has a height b2, which is approximately equal to the floating height h, as shown in FIG. 25D. The fine projection 121-3 has a height b3, which is greater than the floating height h by a length A, as shown in FIG. 25F.

As shown in FIG. 25B, the fine projection 121-1 can pass below the MR head 130 without hitting the end surface 151 of the film structure part 134. Hence, the envelope of the read signal obtained in that state is as shown in FIG. 25C, in which no abnormal signal due to the thermal asperity can occur.

As shown in FIG. 25D, the fine projection 121-2 hits the end surface 151 of the film structure part 134. However, it should be noted that the fine projection 121-2 hits a rear portion 151a of the end surface 151, the rear portion 151a being located on a downstream side of the MR element 143. Thus, the fine projection 121-2 does not hit the MR element 143. Hence, the envelope of the read signal obtained in this case does not have any abnormal signal due to the thermal asperity, as shown in FIG. 25E.

Figure 25G:
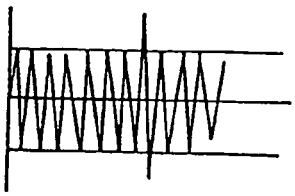

As shown in FIG. 25F, the fine projection 121-3 hits a portion of the slider 133 in the vicinity of the edge 133g, and pushes the MR head 130 upwardly. Then, the MR head 130 descends. While the MR head is descending after it is pushed upward, the fine projection 121-3 may hit the MR element 143. Even if the fine projection 121-3 hits the MR element 143, the amount of energy applied to the MR element 143 at this time is much less than that applied to the MR element 143 when the fine projection 121-3 directly hits the MR element 143. Hence, the envelope of the read signal obtained at this time is as shown in FIG. 25G, in which a small abnormal signal due to the thermal asperity is superimposed on the read signal.

Figure 26:
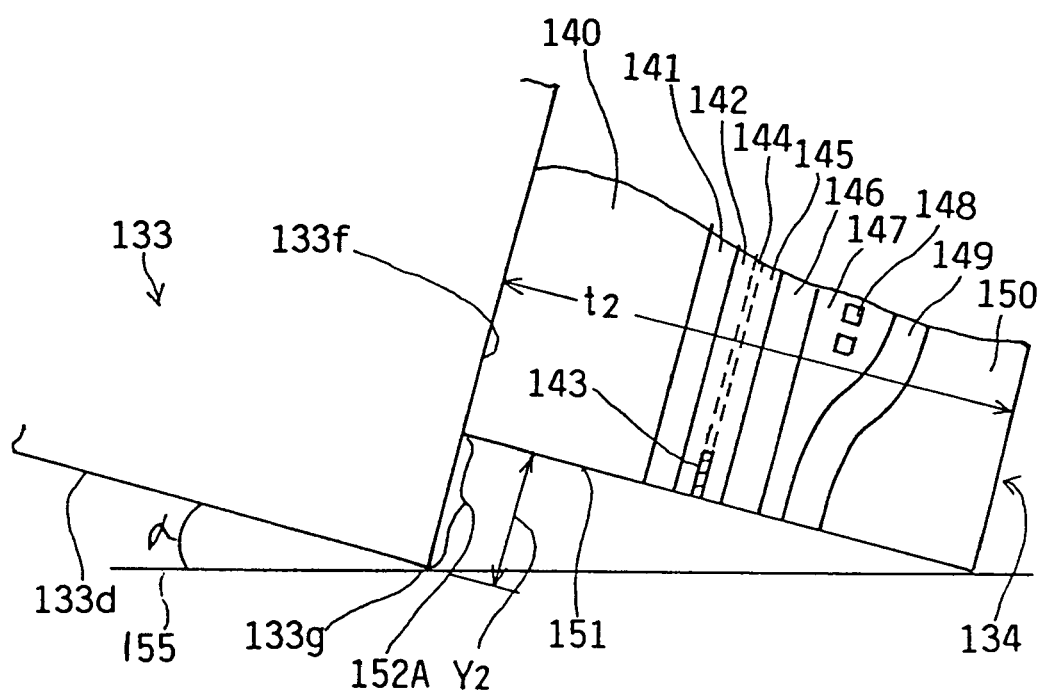
FIG. 26 is an enlarged side view of an MR head according to a sixth embodiment of the present invention.

A description will now be given, with reference to FIG. 26, of a sixth embodiment of the present invention. In FIG. 26, parts that are the same as those shown in the previously described figures are given the same reference numbers. An MR head 130A shown in FIG. 26 has the end surface 151 of the film structure part 134 having a step-like recess 152A of a step size Y2 with respect to the floating surface 133d. The depth of the step-like recess 152A, that is, the step size Y2, satisfies the following condition:

$$Y2 \geq t2 \times \tan \alpha$$

where t2 is the thickness of the film structure part 134, and α is the floating angle of the MR head 130A. The step size Y2 is greater than the step size Y1 of the fifth embodiment of the present invention.

Figure 27A:
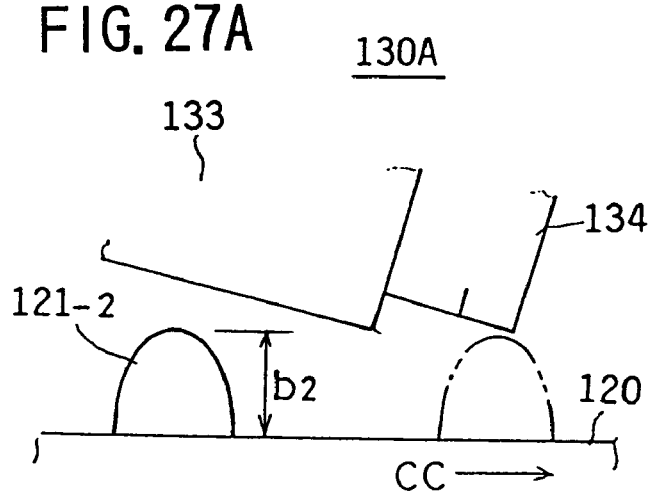
FIGS. 27A, 27B, 27C and 27D are diagrams showing a function of a step-like recess formed in the MR head according to the sixth embodiment of the present invention.
Figure 27B:
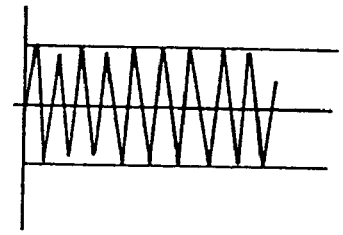

As shown in FIG. 27A, the aforementioned fine projection 121-2 can pass below the MR head 130A without hitting the end surface 151 of the film structure part 134, as in the case of the fine projection 121-1 which has been described with reference to FIG. 25B. The envelope of the read signal obtained in the case shown in FIG. 27A does not have any abnormal signal due to the thermal asperity.

Figure 27C:
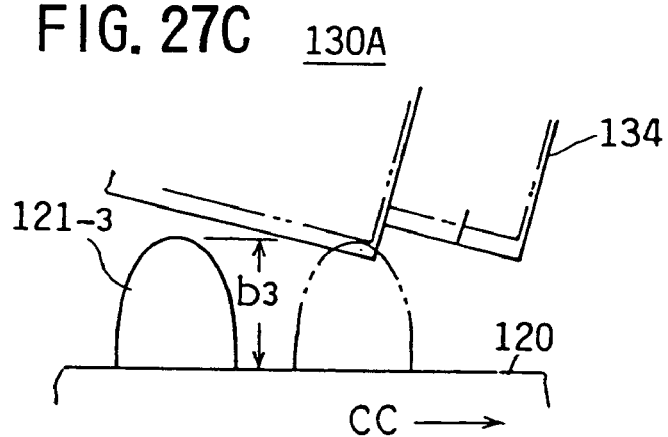
Figure 27D:
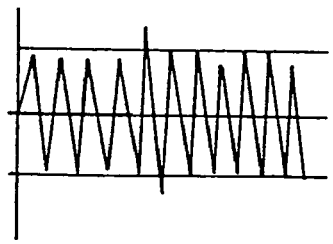

As shown in FIG. 27C, the fine projection 121-3 hits a portion in the vicinity of the edge 133g of the floating surface 133d of the slider 133. The MR head 130A is pushed upwardly by the fine projection 121-3, and then descends. Since the step size Y2 is greater than the step size Y1, the MR element 143 hits a rear portion of the fine projection 121-3. Hence, the possibility that the fine projection 121-3 hits the MR element 143 when the MR head 130A descends can be reduced. Even if the fine projection 121-3 hits the MR element 143, the MR element 143 will receive a smaller amount of energy than the amount of energy applied to the MR element 143 obtained when the fine projection 121-3 directly hits the MR element 143. Hence, as shown in FIG. 27D, the read signal has an envelope in which a small abnormal signal due to the thermal asperity is superimposed thereon. The reduced abnormal signal can be processed by a signal processing circuit so that it can be eliminated from the read signal. As a result, the reproduced signal is less affected by the thermal asperity.

Figure 28A:
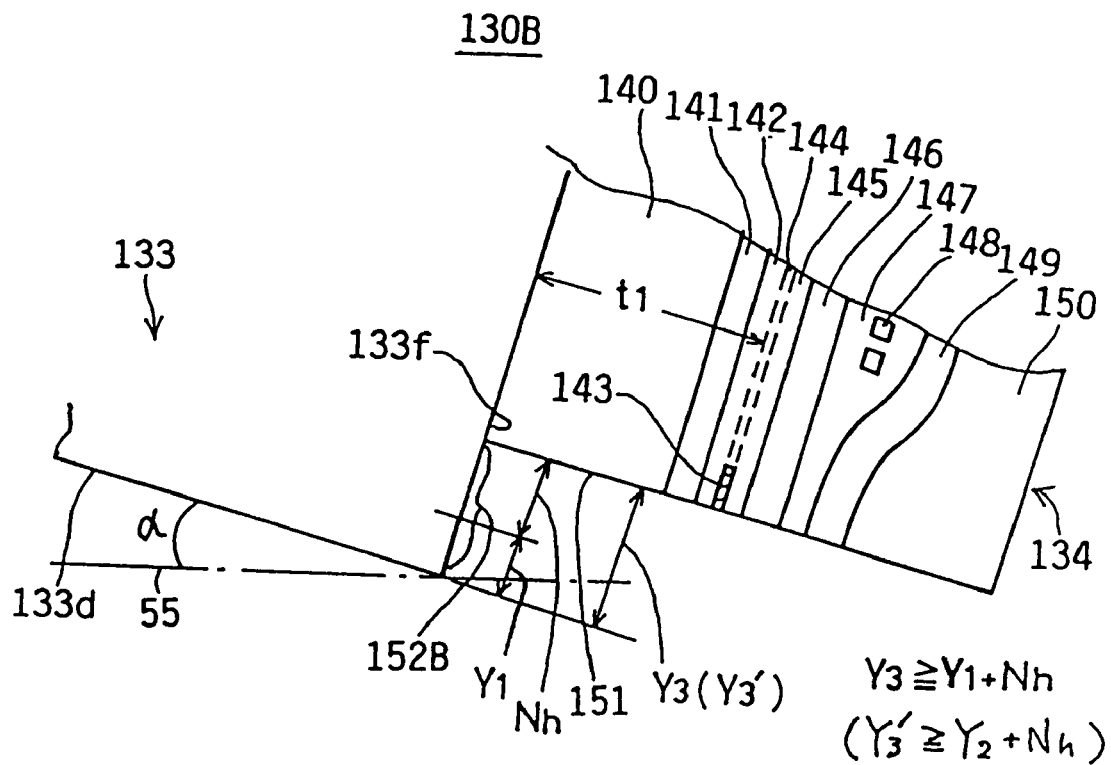
FIGS. 28A and 28B are enlarged side views of an MR head according to a seventh embodiment of the present invention.

FIG. 28A shows an MR head 130B according to a seventh embodiment of the present invention. In FIG. 28A, parts that are the same as those shown in the previously described figures are given the same reference numbers. The MR head 130B has a structure configured by taking into consideration a thermal expansion of the film structure part 134.

Figure 28B:
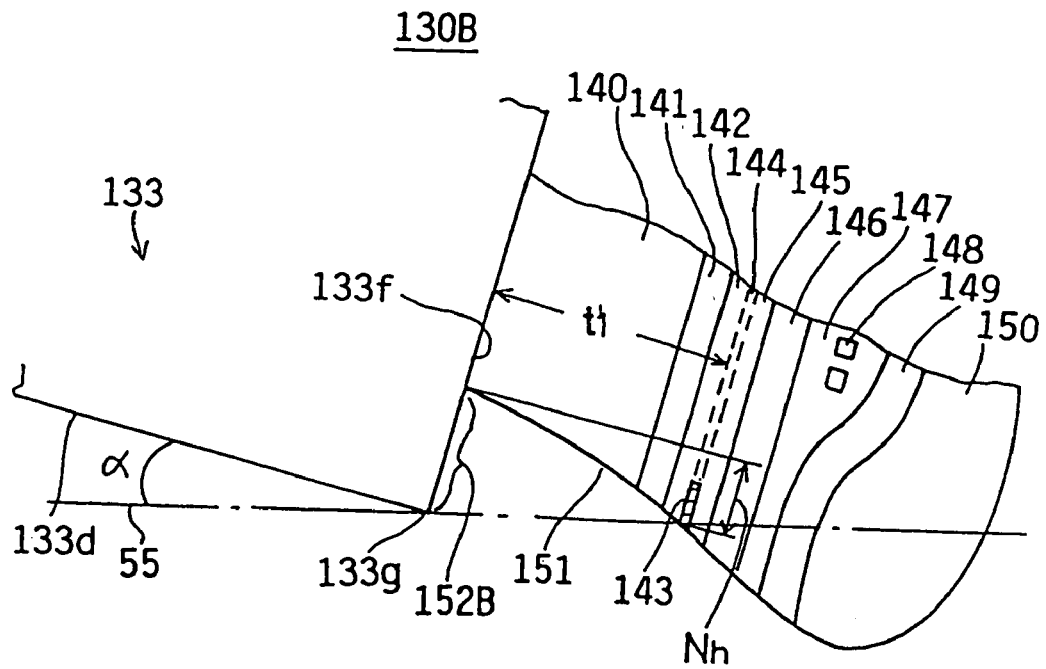

There is a possibility that the temperature of the film structure part 134 is increased when the MR head 130B is in operation. In this case, as shown in FIG. 28B, the film structure part 134 swells due to thermal expansion and the end surface 151 is deformed so as to have a convex shape. The magnitude Nh of the swelling of the MR element 143 is as indicated in FIG. 28B.

As shown in FIG. 28A, the end surface of the film structure part 134 has a step-like recess 152B having a step size (depth) Y3 with respect to the floating surface 133d. The depth of the step-like recess 152B, that is, the step size Y3, is determined by adding the magnitude Nh of the swelling to the aforementioned step size Y1. Hence, even if the temperature of the film structure part 134 rises while the MR head 130B is operating, the MR element 143 is deformed so as to have a swelling close to the imaginary plane 155, but does not project from the imaginary plane 155. Hence, even if the film structure part 134 is deformed, a fine projection located on the magnetic disk 120 will not directly hit the MR element 143, and the occurrence of an abnormal signal due to the thermal asperity can be suppressed.

The MR head 130B thus configured will be suitable for a high-temperature circumstance.

Figure 29:
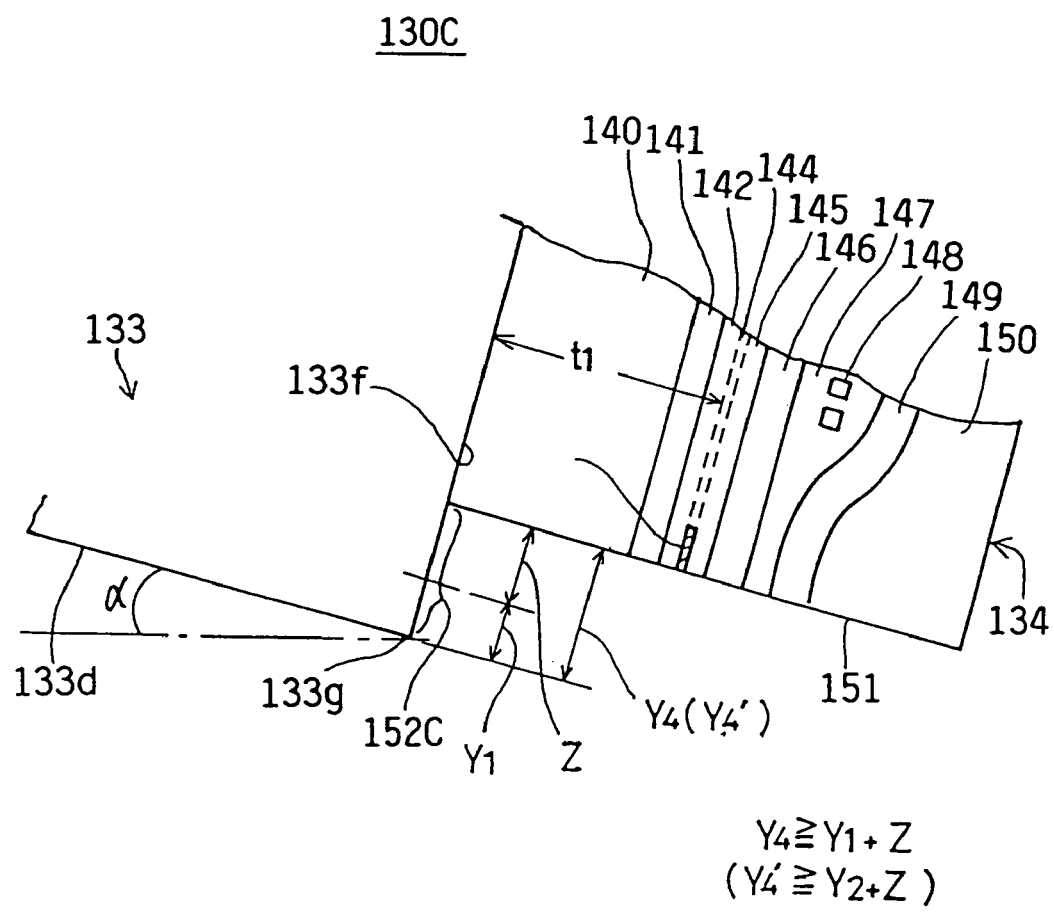
FIG. 29 is an enlarged side view of an MR head according to an eighth embodiment of the present invention.

FIG. 29 shows an MR head 130C according to an eighth embodiment of the present invention, in which parts that are the same as those shown in the previously described figures are given the same reference numbers. The MR head 130C has a structure configured by taking into consideration the descending movement of the MR head 130C after the MR head 130C is hit by a fine projection, more particularly, an overshooting movement of the MR head 130C which occurs during the descending movement.

Figure 30A:
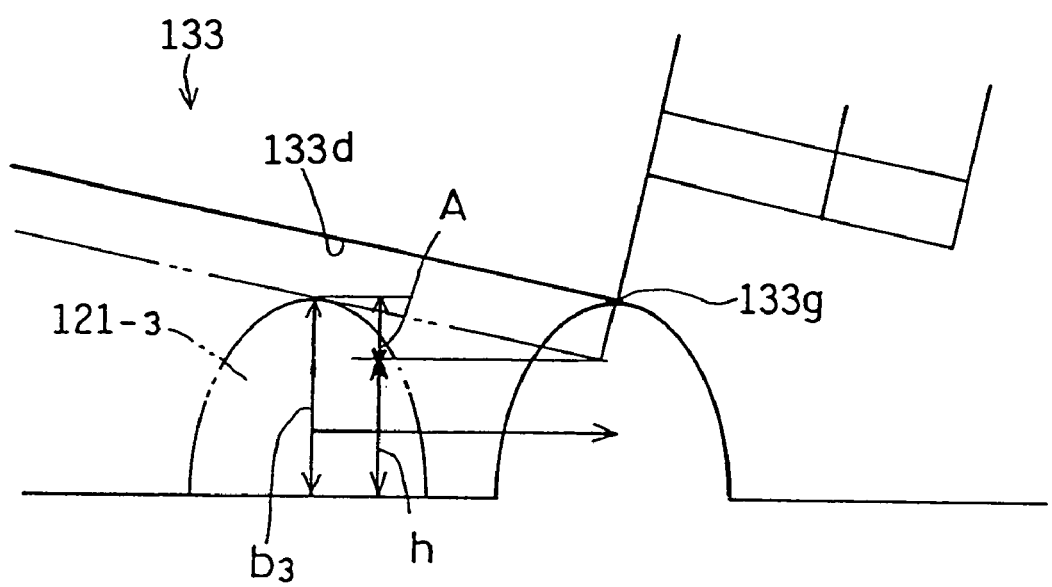
FIGS. 30A and 30B are diagrams showing a head descending movement including an overshoot.
Figure 30B:
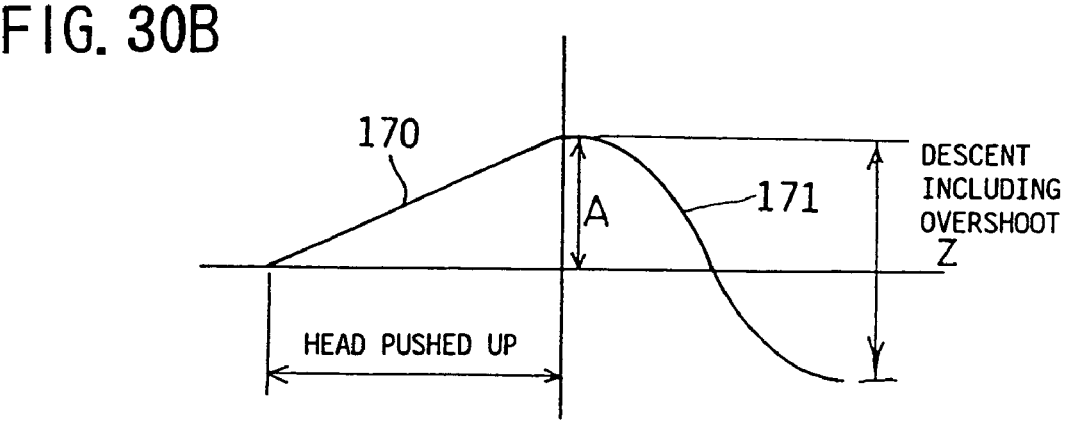

As shown in FIG. 29, the end surface 151 of the film structure part 134 has a step-like recess 152C having a step size (depth) Y4 with respect to the floating surface 133d. The depth of the step-like recess 152C, that is, the step size Y4 is defined by adding a descending movement Z to the aforementioned step size Y1. That is, $Y4 \geq Y1+Z.$ As shown in FIG. 30A, the fine projection 121-3 (having a relatively large size) hits a portion in the vicinity of the edge 133d of the floating surface 133d. The MR head 130C is pushed upwardly by the fine projection 121-3, and then descends. FIG. 30B shows the above movement of the MR head 130C, in which the horizontal axis denotes time and the vertical axis denotes the amount of movement of the MR head 130C. A solid line 170 in FIG. 30B indicates a movement of the MR head 130C observed after it is hit by the fine projection 121-3. A solid line 171 indicates a movement of the MR head 130C observed after the MR head 130C passes over the edge 133g of the slider 133.

The solid line 171 can be expressed as follows:

$Z = A \times \{1 - \sin(\pi/2 + X)\}$ where A is an overshooting distance which exceeds the amount h of floating caused by the fine projection 121-3, and X is a phase of the MR head 130C defined as follows:

$X = 2\pi \times t1/(U/2fo)$ where U is the peripheral velocity of the magnetic disk obtained in the position corresponding to the position of the MR head 130C, and fo is the resonance frequency of the MR head 130C.

The MR element 143 can be prevented from being hit by the fine projection 121-3 during the time when the fine projection 121-3 hits a slider portion in the vicinity of the edge 133g of the floating surface 133d and the MR head 130C is pushed upwardly and then descends with an overshoot. Hence, no abnormal signal is superimposed on the read signal.

Figure 31:
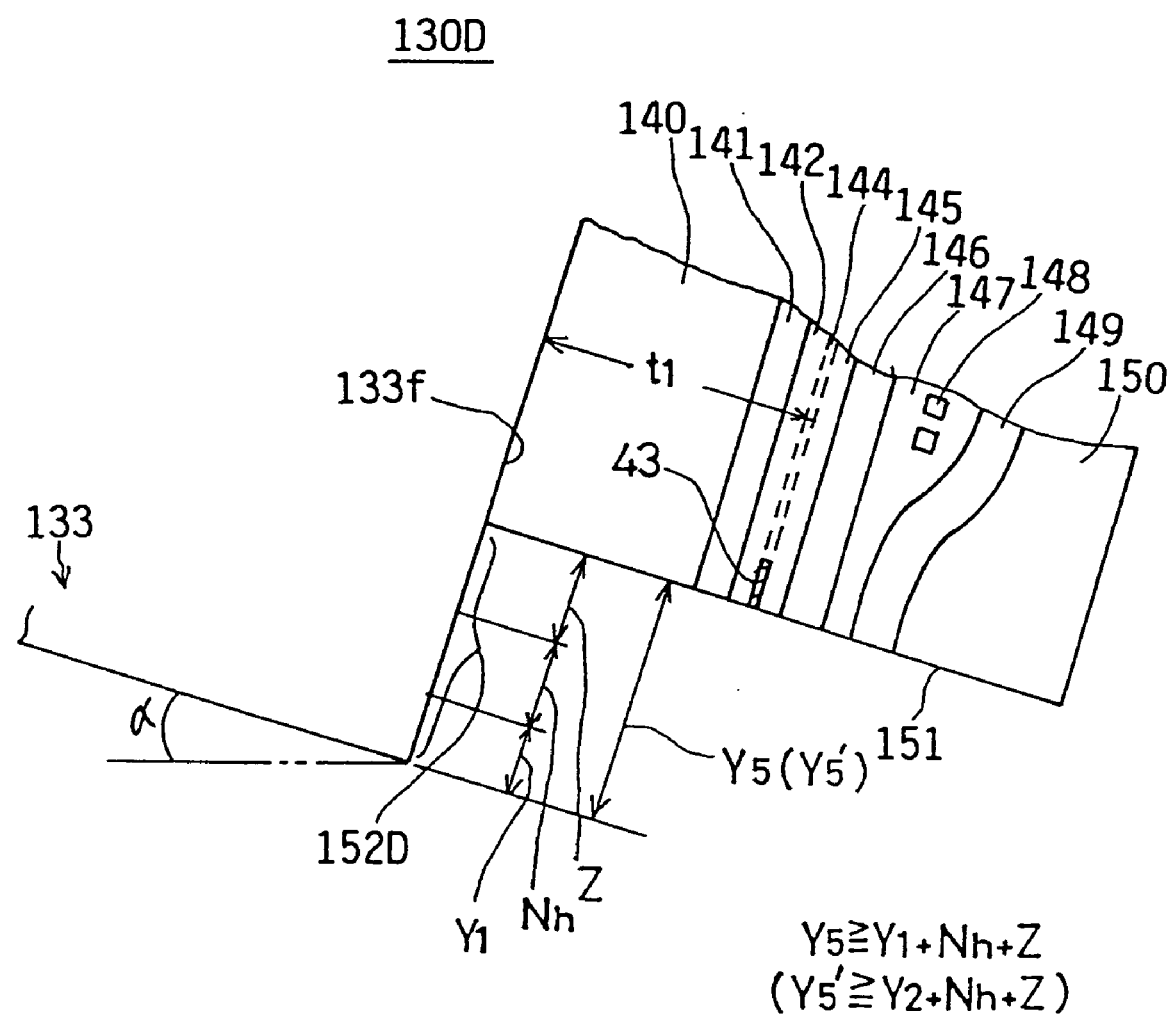
FIG. 31 is an enlarged side view of an MR head according to a ninth embodiment of the present invention.

FIG. 31 shows an MR head 130D according to a ninth embodiment of the present invention, in which parts that are the same as those shown in the previously described figures are given the same reference numbers. The end surface 151 of the film structure part 134 has a step-like recess 152D having a step size (depth) Y5 with respect to the floating surface 133d. The depth of the step-like recess 152D, that is, the step size Y5 is defined by adding the aforementioned magnitude Nh of the swelling and the descending movement Z to the aforementioned step size Y1. That is, the step size Y5 satisfies the following condition:

$Y5 \geq Y1+Nh+Z.$

The MR head 130D has an advantage in that no abnormal signal due to the thermal asperity is generated in an environment in which the MR head 130D is used at a high temperature and the fine projection 121-3 having a relatively large size hits the MR head 130D.

Any of the MR heads 130A–130D can be used in the magnetic disk apparatus 61 shown in FIG. 13.

Figure 32:
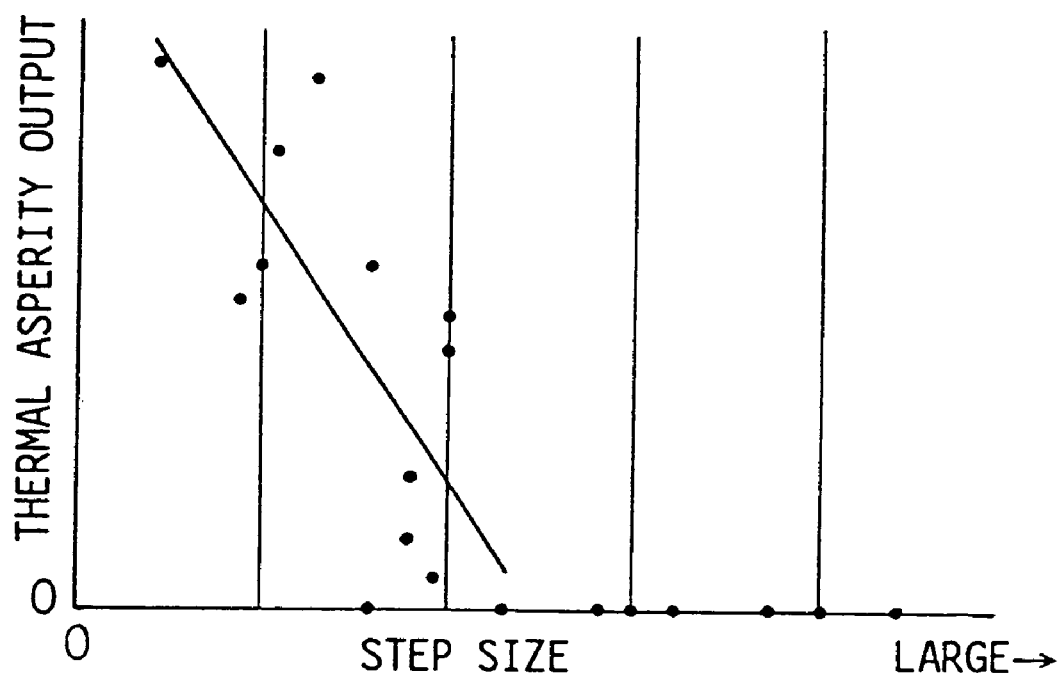
FIG. 32 is a graph of a relationship between a thermal asperity output and the depth of the step-like recess.

FIG. 32 shows results of an experiment conducted by the inventors. More particularly, FIG. 32 shows a relationship between the abnormal signal due to the thermal asperity and the step size of the end surface 151 of the film structure part 134 with respect to the floating surface 133d. As shown in FIG. 32, the abnormal signal due to the thermal asperity can be reduced as the step size is increased.

The step-like recess functions to increase the distance between the end surface of the MR element 143 and the surface of the magnetic disk. The step-like recess does not have a large size, and thus the operation of reproducing the recorded signal from the magnetic disk by the MR element 143 is little affected by the presence of the step-like recess.

It is possible to use the step size Y2 shown in FIG. 26 as a reference in the aforementioned conditions instead of the step size Y1 shown in FIG. 23. In this case, the seventh embodiment of the present invention shown in FIG. 28A has a step size Y3' which satisfies the following condition:

$$Y3' \geq Y2 + Nh.$$

The eighth embodiment of the present invention shown in FIG. 29 has a step size Y4' which satisfies the following condition:

$$Y4' \geq Y2 + Z.$$

The ninth embodiment of the present invention shown in FIG. 31 has a step size Y5' which satisfies the following condition:

$$Y5' \geq Y2 + Nh + Z.$$

Figure 33:
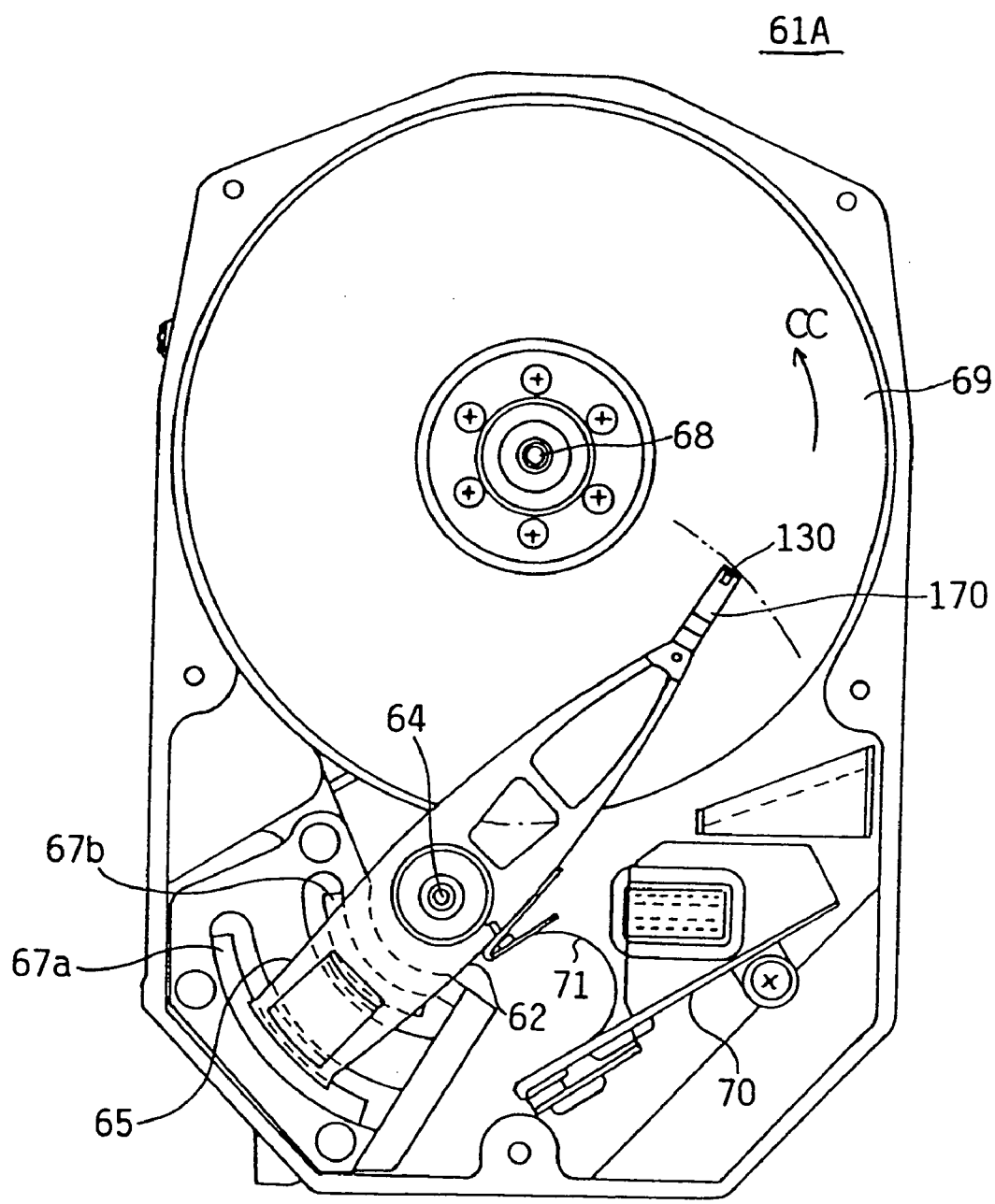
FIG. 33 is a plan view of another magnetic disk apparatus equipped with the MR head of the present invention.
Figure 34:
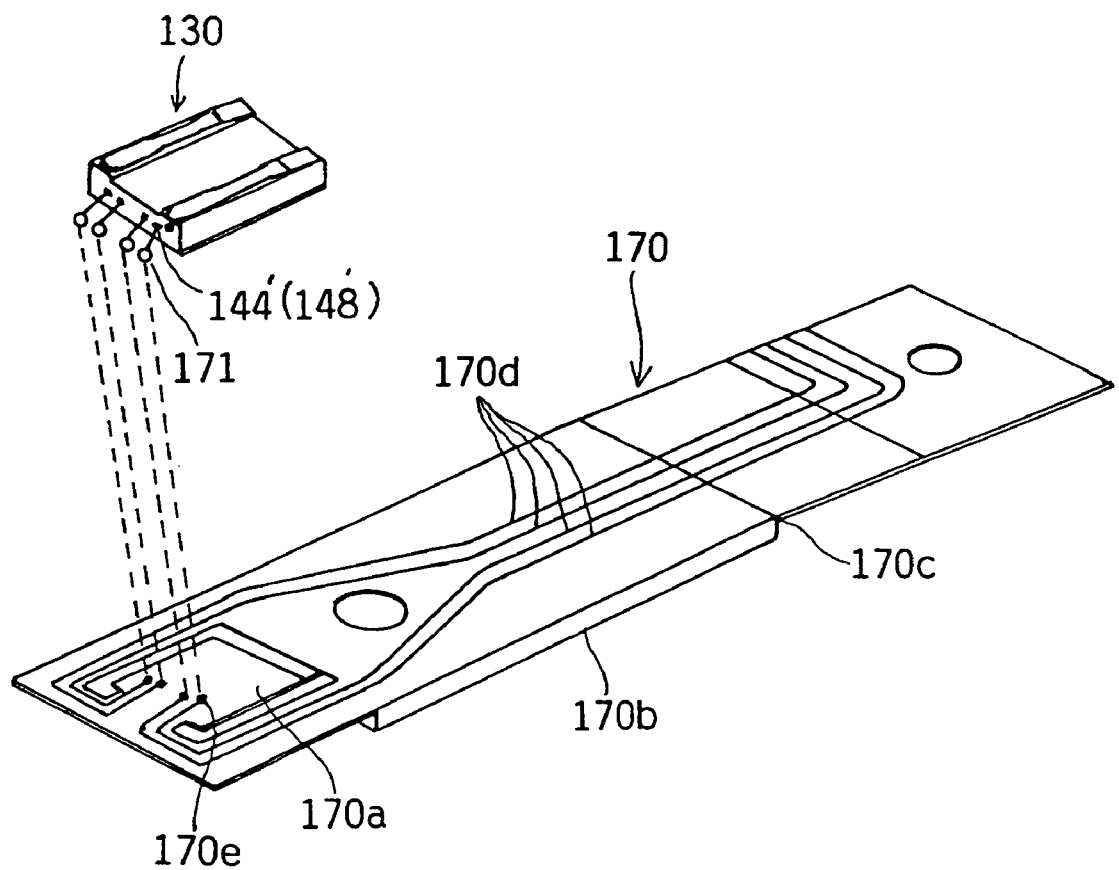
FIG. 34 is an enlarged perspective view of a suspension of the magnetic disk apparatus shown in FIG. 33.

FIG. 33 shows another magnetic disk apparatus 61A in which any of the MR heads 130, 130A, 130B, 130C and 130D can be provided. In FIG. 33, parts that are the same as those shown in FIG. 13 are given the same reference numbers. FIG. 34 shows a suspension 170 of the magnetic disk apparatus 61A in which the suspension 170 has a gimbal part 170a that is integrally formed. The suspension 170 is fixed to an end portion of the rotating arm 163 by, for example, a caulk joint means. The MR head 130 (130A–130D) is fixed to the gimbal part 170a of the suspension 170 by an adhesive. The gimbal part 170a is provided at an end portion of the suspension 170. The suspension 170 has ribs 170b on both sides of a central portion of the suspension 170 so that a given rigidity can be obtained. The suspension 170 has an R bent portion 170c close to a suspension attachment base thereof. Four patterned wiring lines 170d extending from the suspension attachment base and the gimbal portion 170a are provided on the suspension 170. Two of the four lines 170d are used for the MR element 143, and the remaining two lines are used for the inductive head. Ends 170e of the four patterned wiring lines 170d are electrically connected to the terminal parts 144' and 148' by electrically conductive balls 171 of, for example, gold. The MR head 130 is urged toward the magnetic disk 69 due to the elasticity of the R bent portion 170c.

The present invention is not limited to the above described embodiments, and variations and modifications may be made without departing from the scope of the present invention.

What is claimed is:

1. A magnetic head comprising:
   a slider having a rail with a top surface extending in a longitudinal direction thereof;
   a thin-film element part to write and read information, formed on an end of said rail top surface of said slider along the longitudinal direction; and
   a protective film formed on said thin-film element part and defining a distal end of the rail along the longitudinal direction whereby air exits said slider at said distal end,
   said protective film having a first recess which extends in the longitudinal direction between said thin-film element part and said distal end, said first recess being lower than said rail top surface, having a width defined by a width of said rail, and having a top surface substantially parallel to the rail top surface.

2. A magnetic disk apparatus comprising:
   a head supporting part to carry a magnetic head claimed in claim 1, to write and read information by enabling said head to float over a recording medium;
   an arm part on which said head supporting part is provided; and
   a driving part to move said arm part over said recording medium.

3. The magnetic head as claimed in claim 1, wherein said protective film further has a second recess which extends between said thin-film element part and a side of said slider in a direction generally perpendicular to the longitudinal direction.

4. The magnetic head as claimed in claim 3, wherein said second recess has a top surface which is substantially parallel to said rail top surface and is lower than the first recess.

5. A magnetic head comprising:
   a slider having a rail with a top surface extending in a longitudinal direction thereof, said rail formed on a surface of said slider;
   a thin-film element part to write and read information, formed on an end of said rail top surface of said slider along the longitudinal direction; and
   a protective film formed on said thin-film element part and defining a distal end of the rail along the longitudinal direction whereby air exits said slider at said distal end,
   said protective film having a recess which extends in the longitudinal direction between said thin-film element part and said distal end and having a top surface substantially parallel to the rail top surface,
   said recess being lower than said rail top surface and having a width equal to a width of said rail.

* * * * *